US011256342B2

(12) United States Patent
Henrikson et al.

(10) Patent No.: US 11,256,342 B2
(45) Date of Patent: Feb. 22, 2022

(54) MULTIMODAL KINEMATIC TEMPLATE MATCHING AND REGRESSION MODELING FOR RAY POINTING PREDICTION IN VIRTUAL REALITY

(71) Applicant: FACEBOOK TECHNOLOGIES, LLC, Menlo Park, CA (US)

(72) Inventors: Rorik Henrikson, Toronto (CA); Tovi Samuel Grossman, Toronto (CA); Sean Edwin Trowbridge, Redmond, WA (US); Hrvoje Benko, Seattle, WA (US); Daniel John Wigdor, Toronto (CA); Marcello Giordano, Toronto (CA); Michael Glueck, Toronto (CA); Tanya Renee Jonker, Seattle, WA (US); Aakar Gupta, Redmond, WA (US); Stephanie Santosa, Toronto (CA); Carolina Brum Medeiros, Montreal (CA); Daniel Clarke, Toronto (CA)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/021,852

(22) Filed: Sep. 15, 2020

(65) Prior Publication Data
US 2020/0409481 A1    Dec. 31, 2020

Related U.S. Application Data

(63) Continuation-in-part of application No. 16/560,874, filed on Sep. 4, 2019, now Pat. No. 10,824,247.
(Continued)

(51) Int. Cl.
*G06F 3/0346*    (2013.01)
*G06F 3/01*    (2006.01)

(52) U.S. Cl.
CPC ............ *G06F 3/0346* (2013.01); *G06F 3/013* (2013.01); *G06F 2203/0381* (2013.01)

(58) Field of Classification Search
CPC ............ G06F 3/011–014; G06F 3/017; G06F 3/0346; G06F 3/04815; G06F 2203/0381; G06T 19/003; G06T 19/006
See application file for complete search history.

(56) References Cited

U.S. PATENT DOCUMENTS

| | | | | |
|---|---|---|---|---|
| 9,285,874 | B2 * | 3/2016 | Bychkov | ................. G06F 3/011 |
| 9,342,146 | B2 * | 5/2016 | Bychkov | ................. G06F 3/011 |
| | | (Continued) | | |

OTHER PUBLICATIONS

Henrikson, Notice of Allowance, U.S. Appl. No. 16/560,874, dated Jul. 17, 2020, 13 pgs.

*Primary Examiner* — Gene W Lee
(74) *Attorney, Agent, or Firm* — Morgan, Lewis & Bockius LLP

(57) ABSTRACT

An electronic device tracks, for a user performing a target acquisition movement within a 3D space, movement parameters of a plurality of input devices of the user. The electronic device predicts, for the user, a region of interest within the 3D space, using a regression model, based on the movement parameters. The region of interest includes a plurality of targets in close proximity. The electronic device predicts an endpoint of the target acquisition movement, within the region of interest, using a pointer facilitation technique. In some embodiments, the plurality of input devices includes an eye tracking input device, each input device corresponds to a predefined input device type, and the movement parameters include gaze data from the eye tracking input device. In some embodiments, input devices includes an eye tracking input device, a head-mounted display, and a hand-held controller, and the user's eye, hand, and head movements are coordinated.

20 Claims, 10 Drawing Sheets

Related U.S. Application Data

(60) Provisional application No. 62/828,897, filed on Apr. 3, 2019.

(56) References Cited

U.S. PATENT DOCUMENTS

| | | | | |
|---|---|---|---|---|
| 9,348,419 B2* | 5/2016 | Julian | | G06F 3/017 |
| 9,454,225 B2* | 9/2016 | Bychkov | | G06F 3/017 |
| 9,645,654 B2* | 5/2017 | Perez | | G06F 3/011 |
| 9,646,201 B1* | 5/2017 | Horowitz | | G06T 7/246 |
| 9,659,403 B1* | 5/2017 | Horowitz | | G06T 7/70 |
| 9,679,215 B2* | 6/2017 | Holz | | G06K 9/00523 |
| 9,696,795 B2* | 7/2017 | Marcolina | | G06T 19/006 |
| 9,740,242 B2* | 8/2017 | Gordon | | G06F 1/1635 |
| 9,767,613 B1* | 9/2017 | Bedikian | | G06F 3/04845 |
| 9,778,752 B2* | 10/2017 | Holz | | G06F 3/017 |
| 9,785,247 B1* | 10/2017 | Horowitz | | G06T 7/20 |
| 9,857,876 B2* | 1/2018 | Hare | | G06F 3/017 |
| 9,868,449 B1* | 1/2018 | Holz | | G06K 9/00355 |
| 9,886,097 B2* | 2/2018 | Horowitz | | G06T 7/248 |
| 9,911,240 B2* | 3/2018 | Bedikian | | G06F 3/04845 |
| 9,983,686 B2* | 5/2018 | Horowitz | | G06F 3/011 |
| 9,996,797 B1* | 6/2018 | Holz | | G06F 3/04842 |
| 10,082,870 B2* | 9/2018 | Thunstrom | | G09G 5/37 |
| 10,095,269 B2* | 10/2018 | Gordon | | G06F 1/1635 |
| 10,156,909 B2* | 12/2018 | Kamiya | | G06F 3/011 |
| 10,168,873 B1* | 1/2019 | Holz | | G06F 3/011 |
| 10,261,594 B2* | 4/2019 | Marcolina | | G06F 3/017 |
| 10,318,010 B2* | 6/2019 | Horowitz | | G06F 3/017 |
| 10,330,935 B2* | 6/2019 | Shpunt | | H04N 13/376 |
| 10,353,464 B2* | 7/2019 | Skogo | | G06F 3/013 |
| 10,416,834 B1* | 9/2019 | Holz | | G06F 3/011 |
| 10,429,923 B1* | 10/2019 | Johnston | | G02B 27/0176 |
| 10,429,943 B2* | 10/2019 | Horowitz | | G01S 3/00 |
| 10,607,413 B1* | 3/2020 | Marcolina | | G06F 3/017 |
| 10,691,219 B2* | 6/2020 | Holz | | G06F 3/017 |
| 10,895,908 B2* | 1/2021 | Nijs | | G06F 3/013 |
| 2009/0110237 A1* | 4/2009 | Wang | | G06F 3/017 |
| | | | | 382/103 |
| 2012/0272179 A1* | 10/2012 | Stafford | | G06F 3/038 |
| | | | | 715/781 |
| 2015/0169076 A1* | 6/2015 | Cohen | | G06F 3/0304 |
| | | | | 345/156 |
| 2018/0052521 A1 | 2/2018 | Kamiya et al. | | |
| 2018/0210561 A1 | 7/2018 | Shigemori et al. | | |
| 2020/0018926 A1* | 1/2020 | Saito | | G06F 3/038 |
| 2020/0167556 A1 | 5/2020 | Kaur et al. | | |

* cited by examiner (a) Controller Positional Velocity (CP)

(b) Controller Angular Velocity (CV)

(c) HMD Positional Velocity (HP)

(d) HMD Angular Velocity (HV)

MULTIMODAL KINEMATIC TEMPLATE MATCHING AND REGRESSION MODELING FOR RAY POINTING PREDICTION IN VIRTUAL REALITY

RELATED APPLICATION

The current application is a continuation-in-part application of U.S. application Ser. No. 16/560,874, filed Sep. 4, 2019, entitled "Head-Coupled Kinematic Template Matching for Predicting 3D Ray Cursors," which claims the benefit of U.S. Provisional Patent Application Ser. No. 62/828,897, filed Apr. 3, 2019, entitled "Head-Coupled Kinematic Template Matching For Predicting 3D Ray Cursors," each of which is incorporated by reference herein in its entirety.

TECHNICAL FIELD

This application relates generally to gaming entertainment and artificial-reality systems, and more specifically to artificial-reality systems having a head-mounted display (HMD).

BACKGROUND

Artificial-reality devices have wide applications in various fields, including engineering design, medical surgery practice, military simulated practice, and video gaming. In the last several years, there has been significant increase in the popularity and availability of virtual reality (VR) technologies. Many human-computer interface interaction challenges are still prevalent. Specifically, target selection, one of the core tasks in VR systems, remains problematic due to the spatial nature of VR environments.

SUMMARY

In 2D environments, endpoint predictive models have been developed that could be used to facilitate pointing tasks. With such models, the system continuously analyzes the cursor trajectory as it moves towards an intended target, and tries to predict what the final endpoint of the trajectory will be. One technique, Kinematic Template Matching (KTM), matches cursor velocity to a library of templates from known movements, to predict end location. Such techniques, however, do not readily apply in a 3D space. In particular, 2D Kinematic Template Matching only considers the two-dimensional cursor trajectory to build and match template gestures.

Accordingly, there is a need to be able to predict the endpoint of a cursor in three-dimensional (3D) VR environments. Disclosed techniques provide endpoint prediction in 3D VR pointing. A method is provided to include alternative and additional input device types, such as head movement, in the templates used for KTM. This allows the prediction to be based on where users are looking, in addition to the cursor trajectory. The kinematics of the controller and the Head-Mounted Display (HMD) can be used together to predict the end point of the movement. The disclosed techniques can be applied for displays that are not head-mounted as well (e.g., large displays).

In some embodiments, the method includes tracking, during a ray cursor target acquisition movement, the velocity of both the controller and the head mounted display. These velocity profiles are matched to a library of templates to predict the final ray position.

(A1) In some embodiments, the solution explained above is implemented on an electronic device that includes a display, one or more processors, and memory storing one or more programs. The method includes selecting a subset of templates from a library of templates. Each template in the library of templates comprises logged movements of one or more predefined input device types in a 3D space and each template includes one or more movement parameters. The method includes tracking, for a user, movement parameters of at least one input device of the user. The at least one input device corresponds to one of the predefined input device types. (When there are two or more input devices, each input device corresponds to a respective one of the predefined device types.) The method includes comparing the tracked movement parameters of the at least one input device of the user to the movement parameters of the subset of the templates selected from the library of templates. The method further includes predicting, based on the comparison, a goal target ray, within the 3D space, which may be displayed on the display for the user.

(A2) In some embodiments of A1, the one or more movement parameters of each template comprise a positional velocity and an angular velocity of the one or more predefined input device types.

(A3) In some embodiments of A1, the subset of templates comprises seven of the templates from the library of templates. The seven templates are selected based on similarities between the seven templates and the tracked movement parameters of the at least one input device of the user.

(A4) In some embodiments of A1, comparing the tracked movement parameters of the at least one input device of the user to the subset of templates comprises generating a weighted score for each movement parameter of the tracked movement parameters.

(A5) In some embodiments of A4, the weights of the weighted score change dynamically for different portions of the user input (A6) In some embodiments of A1, the at least one input device of the user includes a hand of the user or a handheld controller of the user.

(A7) In some embodiments of A1, the at least one input device of the user includes a head (or HMD) of the user.

(A8) In some embodiments of A1, the at least one input device of the user includes a hand (e.g., or handheld controller) of the user and a head (e.g., or HMD) of the user, and the tracked movement parameters include movement parameters of the hand of the user and movement parameters of the head of the user.

(A9) In some embodiments of A1, the tracked movement parameters of the at least one input device of the user is not a full movement of the user.

(A10) In some embodiments of A1, the prediction is made based on only a first portion of the tracked movement parameters of the at least one input device of the user.

(A11) In some embodiments of A1, the electronic device displays, on the display, a visualization of the goal target ray based on the prediction. This can assist the user in reaching the goal target ray more quickly (or redirect the user's movement if the currently predicted target is incorrect).

(A12) In some embodiments of A11, the visualization comprises zooming or highlighting the predicted target.

(A13) In some embodiments of A1, the subset of templates is selected based in part on the user (e.g., stored characteristics of the user, user preferences, and/or historical data regarding user movements and selections in the 3D space).

(A14) In some embodiments of A1, the electronic device pre-fetches content corresponding to the goal target ray before the user makes the goal target ray. By knowing what a user is likely to select, the system can pre-fetch some data, which expedites the process when the selection actually occurs.

(A15) In some embodiments of A1, the movement parameters are tracked using accelerometers or other sensors on the at least one input device of the user.

(A16) In another aspect, an electronic device is provided that includes a display in communication with an artificial-reality device. The electronic device is configured to implement any of A1-A15.

(B1) In another aspect, a method is provided for predicting future positions and directions of one or more input devices in 3D spaces. The method is performed at an electronic device having a display, one or more processors, and memory storing one or more programs having instructions for performing steps of the method. The method includes tracking, for a user performing a target acquisition movement within a 3D space, movement parameters of a plurality of input devices of the user. The method also includes predicting, for the user, a region of interest within the 3D space, using a regression model, based on the movement parameters. The region of interest includes a plurality of targets in close proximity. The method also includes predicting an endpoint of the target acquisition movement, within the region of interest, using a pointer facilitation technique.

(B2) In some embodiments of the method of B 1, the plurality of input devices includes an eye tracking input device, each input device corresponds to a predefined input device type, and the movement parameters includes gaze data from the eye tracking input device.

(B3) In some embodiments of the method of B1, the regression model represents coordination patterns between input channels of the plurality of input devices.

(B4) In some embodiments of the method of B3, the plurality of input devices includes an eye tracking input device, a head-mounted display (HMD), and a hand-held controller, and the coordination patterns describe coordination between eye, hand and head movements of the user.

(B5) In some embodiments of the method of B4, the movement parameters include velocity profiles for the HMD and the hand-held controller, and saccade velocity profile for the eye tracking device.

(B6) In some embodiments of the method of B1, predicting the endpoint of the target acquisition movement is performed by biasing the pointer facilitation technique to predict a goal target ray towards the region of interest.

(B7) In some embodiments of the method of B6, the biasing is performed during an early ballistic phase of the pointer facilitation technique that corresponds to a ballistic trajectory of eye, head, and hand movement of the user when moving from one target to the next.

(B8) In some embodiments of the method of B1, the method further includes selecting a candidate target from the plurality of targets based on predefined probabilities for presence of the plurality of targets in the 3D space.

(B9) In some embodiments of the method of B1, the regression model is trained based on collecting a set of movement parameters for the plurality of input devices for a plurality of users performing one or more target acquisition movements.

(B10) In some embodiments of the method of B1, the method further includes dynamically adapting a control-display (C-D) ratio based on predicting the region of interest within the 3D space and/or the endpoint of the target acquisition movement.

(B11) In some embodiments of the method of B1, the method further includes predicting likelihood of targets to snap to closest target in the region of interest.

(B12) In some embodiments of the method of B1, the plurality of input devices includes an eye tracking input device, and the movement parameters includes gaze data from the eye tracking input device, and the method further includes predicting object depth for one or more targets within the region of interest based on the gaze data.

(B13) In another aspect, an electronic device is provided that includes a display in communication with an artificial-reality device. The electronic device is configured to implement any of B1-B12.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first and second are used in some instances to describe various elements, these elements should not be limited by these terms. These terms are used only to distinguish one element from another. For example, a first input device could be termed a second input device, and, similarly, a second input device could be termed a first input device, without departing from the scope of the various described embodiments.

The first input device and the second input device are both input devices, but they are not the same input device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when," "upon," "in response to determining," "in response to detecting," or "in accordance with a determination that," depending on the context. Similarly, the phrase "if it is determined" or "if [a stated condition or event] is detected" means "upon determining," "in response to determining," "upon detecting [the stated condition or event]," "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
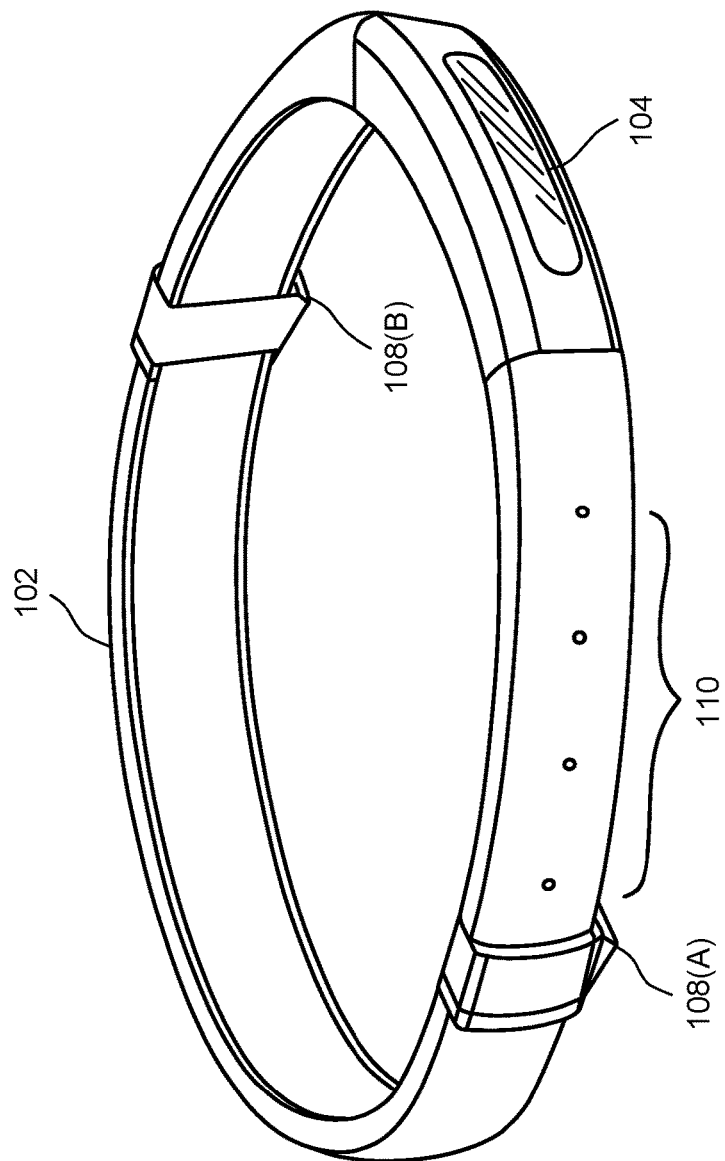
FIG. 1 illustrates an embodiment of an artificial-reality device.
Figure 2:
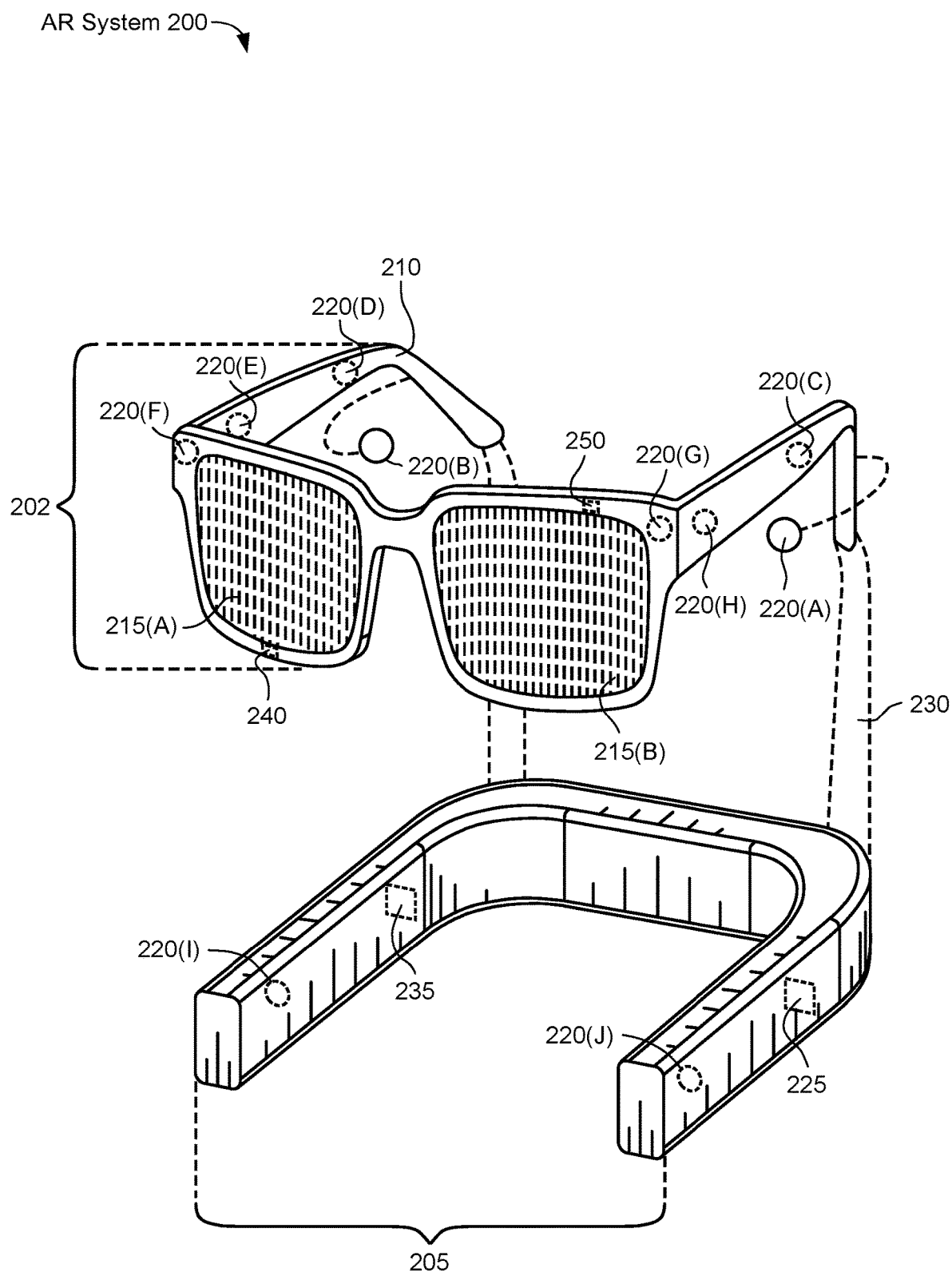
FIG. 2 illustrates an embodiment of an augmented-reality headset and a corresponding neckband.
Figure 3:
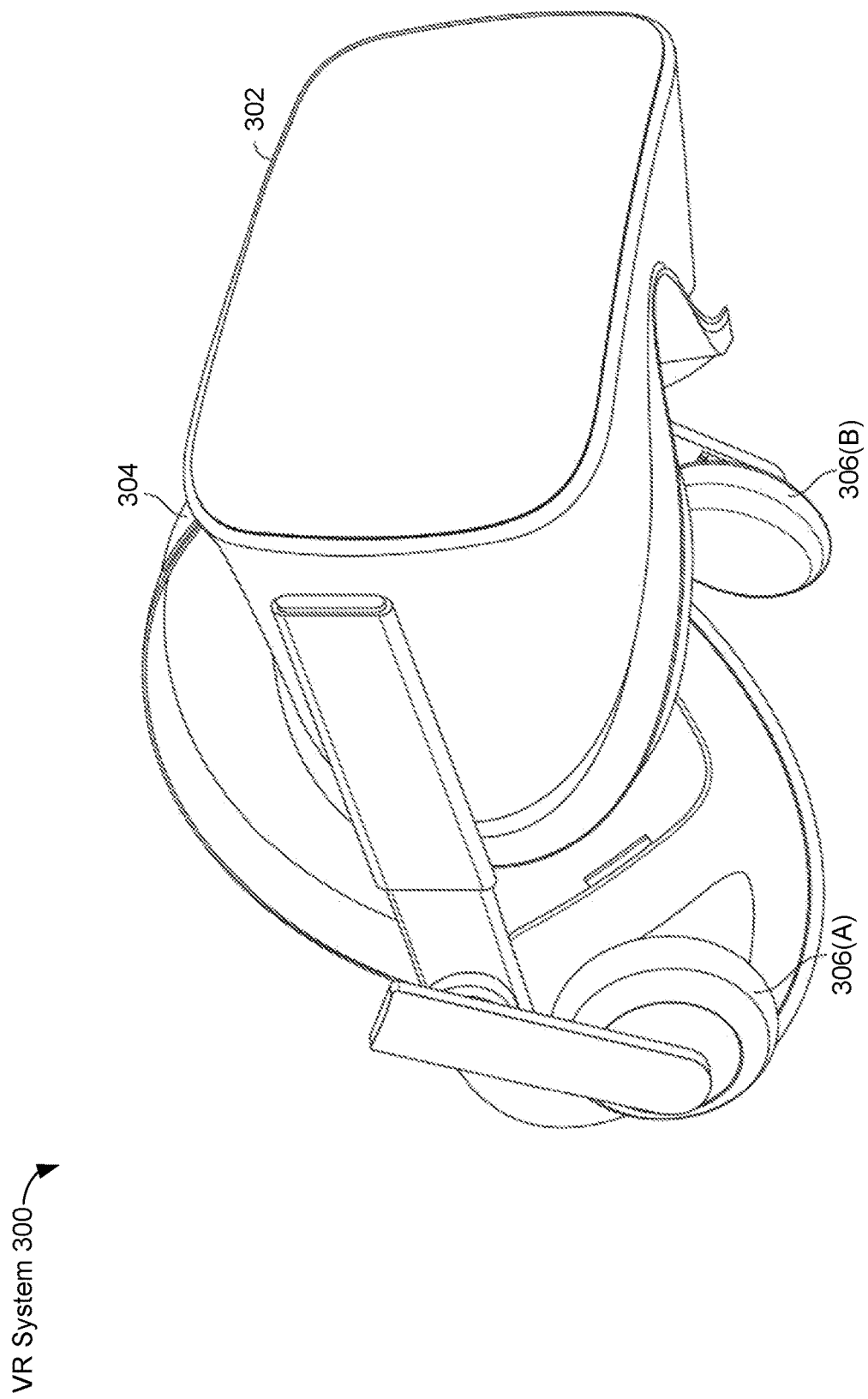
FIG. 3 illustrates an embodiment of a virtual-reality headset.

The following provides, with reference to FIGS. 1-3, detailed descriptions of various types of artificial-reality devices, which may facilitate and/or contribute to a user's artificial reality experience. Detailed descriptions of predicting an end point of a cursor movement are described with reference to FIGS. 4-9. The discussion corresponding to FIG. 10 provides detailed descriptions of an example method for predicting a goal target ray.

Embodiments of this disclosure may include or be implemented in conjunction with various types of artificial-reality systems and/or large display configurations (e.g., 32 or 34 inch video monitors). "Artificial reality" constitutes any form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect for a viewer). In some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial reality systems are designed to work without near-eye displays (NEDs), such as the AR system 100 in FIG. 1. Other artificial reality systems include an NED, which provides visibility into the real world (e.g., the AR system 200 in FIG. 2) or that visually immerses a user in an artificial reality (e.g., the VR system 300 in FIG. 3). While some artificial reality devices are self-contained systems, other artificial reality devices communicate and/or coordinate with external devices to provide an artificial reality experience to a user. Examples of such external devices include handheld controllers, mobile devices, desktop computers, devices worn by a user, devices worn by one or more other users, and/or any other suitable external system.

FIGS. 1-3 provide examples of artificial-reality devices. The AR system 100 in FIG. 1 generally represents a wearable device dimensioned to fit about a body part of a user. As shown, the AR system 100 includes a frame 102 (e.g., a band) and a camera assembly 104, which is coupled to the frame 102 and configured to gather information about a local environment by observing the local environment. The AR system 100 may also include one or more transducers. In one example, the AR system 100 includes output transducers 108(A) and 108(B) and input transducers 110. The output transducers 108(A) and 108(B) may provide audio feedback, haptic feedback, and/or content to a user, and the input audio transducers may capture audio (or other signals/waves) in a user's environment.

Thus, the AR system 100 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 100 may not include a NED, the AR system 100 may include other types of screens or visual feedback devices (e.g., a display screen integrated into a side of the frame 102).

The embodiments discussed in this disclosure may also be implemented in AR systems that include one or more NEDs. For example, as shown in FIG. 2, the AR system 200 may include an eyewear device 202 with a frame 210 configured to hold a right display device 215(A) and a left display device 215(B) in front of a user's eyes (the left and right display are also referred to herein as a "left lens" and a "right lens"). The display devices 215(A) and 215(B) may act together or independently to present an image or series of images to a user. While the AR system 200 includes two displays, embodiments of this disclosure may be implemented in AR systems with a single NED or more than two NEDs.

In some embodiments, the AR system 200 includes one or more sensors, such as the sensors 240 and 250. The sensors 240 and 250 may generate measurement signals in response to motion of the AR system 200 and may be located on substantially any portion of the frame 210. Each sensor may be a position sensor, an inertial measurement unit (IMU), a depth camera assembly, or any combination thereof. The AR system 200 may include zero or more sensors. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof. Sensors are also discussed above with reference to FIG. 1.

The AR system 200 may also include a microphone array with a plurality of acoustic sensors 220(A)-220(J), referred to collectively as the acoustic sensors 220. The acoustic sensors 220 may detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on the frame 210, and/or acoustic sensors 220(I) and 220(J), which may be positioned on a corresponding neckband 205.

The configuration of the acoustic sensors 220 of the microphone array may vary. While the AR system 200 is shown in FIG. 2 having ten acoustic sensors 220, the number of acoustic sensors 220 may be greater or less than ten. In some embodiments, using more acoustic sensors 220 may increase the amount of audio information collected and/or the sensitivity and accuracy of the audio information. In contrast, using a lower number of acoustic sensors 220 may decrease the computing power required by a controller 225 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

The acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of the acoustic sensors 220 on either side of a user's head (e.g., as binaural microphones), the AR device 200 may simulate binaural hearing and capture a 3D stereo sound field around about a user's head (e.g., capture 3D stereo sound generated by the right display 215(A) and/or the left display 215(B)). In some embodiments, the acoustic sensors 220(A) and 220(B) may be connected to the AR system 200 via a wired connection, and in other embodiments, the acoustic sensors 220(A) and 220(B) may be connected to the AR system 200 via a wireless connection (e.g., a Bluetooth connection). In still other embodiments, the acoustic sensors 220(A) and 220(B) may not be used at all in conjunction with the AR system 200.

The acoustic sensors 220 on the frame 210 may be positioned along the length of the temples, across the bridge, above or below the display devices 215(A) and 215(B), or some combination thereof. The acoustic sensors 220 may be oriented such that the microphone array is able to detect sounds in a wide range of directions surrounding the user wearing AR system 200. In some embodiments, an optimization process may be performed during manufacturing of the AR system 200 to determine relative positioning of each acoustic sensor 220 in the microphone array.

The AR system 200 may further include one or more transducers (e.g., mechanical oscillators), which may be collectively referred to as a transducer array. In some embodiments, each transducer includes hardware capable of generating signals (e.g., mechanical waves such as soundwaves, ultrasound waves, or other waves and signals, such as electromagnetic waves). For example, each transducer can convert electrical signals into ultrasound waves (or various other waves). The transducers may be miniature piezoelectric transducers, capacitive transducers, single or multipole voice coil motors, and/or any other suitable device for creation of signals. The one or more transducers are configured to generate signals that vibrate one or more of the frame 210, the right display 215(A), and the left display 215(B).

The AR system 200 may further include or be connected to an external device (e.g., a paired device), such as a neckband 205. As shown, the neckband 205 may be coupled to the eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of the eyewear device 202 and the neckband 205 in example locations on the eyewear device 202 and the neckband 205, the components may be located elsewhere and/or distributed differently on the eyewear device 202 and/or the neckband 205. In some embodiments, the components of the eyewear device 202 and the neckband 205 may be located on one or more additional peripheral devices paired with the eyewear device 202, the neckband 205, or some combination thereof. Furthermore, the neckband 205 generally represents any type or form of paired device. Thus, the following discussion of neckband 205 also applies to various other paired devices, such as smart watches, smart phones, wrist bands, other wearable devices, hand-held controllers, tablet computers, or laptop computers.

Pairing external devices, such as a neckband 205, with AR eyewear devices may enable the eyewear devices to achieve the form factor of a pair of glasses while still providing sufficient battery and computation power for expanded capabilities. Some or all of the battery power, computational resources, and/or additional features of the AR system 200 may be provided by a paired device or shared between a paired device and an eyewear device, thus reducing the weight, heat profile, and form factor of the eyewear device overall while still retaining desired functionality. For example, the neckband 205 may allow components that would otherwise be included on an eyewear device to be included in the neckband 205 because users may tolerate a heavier weight load on their shoulders than they would tolerate on their heads. The neckband 205 may also have a larger surface area over which to diffuse and disperse heat to the ambient environment. Thus, the neckband 205 may allow for greater battery and computation capacity than might otherwise have been possible on a stand-alone eyewear device. Because weight carried in the neckband 205 may be less invasive to a user than weight carried in the eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

The neckband 205 may be communicatively coupled with the eyewear device 202 and/or to other devices. The other devices may provide certain functions (e.g., tracking, localizing, depth mapping, processing, or storage) to the AR system 200. In the embodiment of FIG. 2, the neckband 205 includes two acoustic sensors 220(I) and 220(J), which are part of the microphone array (or potentially form their own microphone subarray). The neckband 205 may also include a controller 225 and a power source 235.

The acoustic sensors 220(I) and 220(J) of the neckband 205 may be configured to detect sound and convert the detected sound into an electronic format (analog or digital). In the embodiment of FIG. 2, the acoustic sensors 220(I) and 220(J) are positioned on the neckband 205, thereby increasing the distance between neckband acoustic sensors 220(I) and 220(J) and the other acoustic sensors 220 positioned on the eyewear device 202. In some cases, increasing the distance between the acoustic sensors 220 of the microphone array improves the accuracy of beamforming performed via the microphone array. For example, if a sound is detected by the acoustic sensors 220(C) and 220(D) and the distance between acoustic sensors 220(C) and 220(D) is greater than, for example, the distance between the acoustic sensors 220(D) and 220(E), the determined source location of the detected sound may be more accurate than if the sound had been detected by the acoustic sensors 220(D) and 220(E).

The controller 225 of the neckband 205 may process information generated by the sensors on the neckband 205 and/or the AR system 200. For example, the controller 225 may process information from the microphone array, which describes sounds detected by the microphone array. For each detected sound, the controller 225 may perform a direction of arrival (DOA) estimation to estimate a direction from which the detected sound arrived at the microphone array. As the microphone array detects sounds, the controller 225 may populate an audio data set with the information (e.g., which may be used to adjust operation of the transducers). In embodiments in which the AR system 200 includes an IMU, the controller 225 may compute all inertial and spatial calculations from the IMU located on the eyewear device 202. The connector 230 may convey information between the AR system 200 and the neckband 205 and between the AR system 200 and the controller 225. The information may be in the form of optical data, electrical data, wireless data, or any other transmittable data form. Moving the processing of information generated by the AR system 200 to the neckband 205 may reduce weight and heat in the eyewear device 202, making it more comfortable to a user.

The power source 235 in the neckband 205 may provide power to the eyewear device 202 and/or to the neckband 205. The power source 235 may include, without limitation, lithium-ion batteries, lithium-polymer batteries, primary lithium batteries, alkaline batteries, or any other form of power storage. In some cases, the power source 235 is a wired power source. Including the power source 235 on the neckband 205 instead of on the eyewear device 202 may help better distribute the weight and heat generated by the power source 235.

As noted, some artificial reality systems may, instead of blending an artificial reality with actual reality, substantially replace one or more of a user's sensory perceptions of the real world with a virtual experience. One example of this type of system is a head-worn display system, such as the VR system 300 in FIG. 3, which mostly or completely covers a user's field of view. The VR system 300 may include a front rigid body 302 and a band 304 shaped to fit around a user's head. The VR system 300 may also include output audio transducers 306(A) and 306(B). Furthermore, while not shown in FIG. 3, the front rigid body 302 may include one or more electronic elements, including one or more electronic displays, one or more IMUs, one or more tracking emitters or detectors, and/or any other suitable device or system for creating an artificial reality experience.

Artificial-reality systems may include a variety of types of visual feedback mechanisms. For example, display devices in the AR system 200 and/or the VR system 300 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial reality systems also include optical subsystems having one or more lenses (e.g., conventional concave or convex lenses, Fresnel lenses, or adjustable liquid lenses) through which a user may view a display screen.

In addition to or instead of using display screens, some artificial reality systems include one or more projection systems. For example, display devices in the AR system 200 and/or the VR system 300 may include micro-LED projectors that project light (e.g., using a waveguide) into display devices, such as clear combiner lenses, which allow ambient light to pass through. The display devices may refract the projected light toward a user's pupil and may enable a user to simultaneously view both artificial reality content and the real world. Artificial-reality systems may also be configured with any other suitable type or form of image projection system.

Artificial-reality systems may also include various types of computer vision components and subsystems. For example, the AR system 100, the AR system 200, and/or the VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 1 and 3, the output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 110 may include condenser microphones, dynamic microphones, ribbon microphones, and/or any other type or form of input transducer. In some embodiments, a single transducer may be used for both audio input and audio output. In some embodiments, transducers (e.g., voice coils, piezoelectrics, and the like) are coupled to the displays of AR/VR systems, and the transducers transform the displays into output audio devices (i.e., speakers).

The artificial-reality systems shown in FIGS. 1-3 may include tactile (i.e., haptic) feedback systems, which may be incorporated into headwear, gloves, body suits, handheld controllers, environmental devices (e.g., chairs or floormats), and/or any other type of device or system. Additionally, in some embodiments, the haptic feedback systems may be incorporated with the artificial reality systems. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms, as described herein. Haptic feedback systems may be implemented independently of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, or business enterprises), entertainment purposes (e.g., for playing video games, listening to music, or watching video content), and/or for accessibility purposes (e.g., as hearing aids or vision aids). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios, including Wi-Fi, Bluetooth, global positioning system (GPS), cellular or other communication devices may also be used to determine a user's location relative to a radio transceiver or group of transceivers (e.g., a Wi-Fi router or group of GPS satellites). Acoustic sensors such as microphone arrays or 2D or 3D sonar sensors may also be used to determine a user's location within an environment. AR and VR devices (such as the systems 100, 200, and 300) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

The artificial reality systems described above in connection with FIGS. 1-3 may also include memory (e.g., the neckband 205 in FIG. 2 may include memory). The memory may be high-speed random access memory, such as DRAM, SRAM, DDR SRAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. The memory, or alternatively the non-volatile memory within the memory, includes a non-transitory computer-readable storage medium. In some embodiments, the memory, or the non-transitory computer-readable storage medium of the memory stores the following programs, modules, and data structures, or a subset or superset thereof:

operating logic, including procedures for handling various basic system services and for performing hardware dependent tasks;

a communication module for coupling to and/or communicating with other devices (e.g., an artificial-reality headset, remote server, or other artificial-realty system) in conjunction with a communication interface (wired or wireless interface);

an artificial-reality generation module, which is used for generating artificial-reality images, including potential targets, and sending corresponding video and audio data to the headset and transducers. In some embodiments, the artificial-reality generation module is a virtual-reality generation module, an augmented-reality generation module, a mixed-reality generation module, or some combination thereof;

an HRTF ("Head-Related Transfer Function") generation module, which is used for computing HRTF filters based on sound profiles (e.g., energy contributions) of audio sources;

an audio output module, which is used for convolving the computed HRTF filters with dry input sound to produce final audio data;

a signal generating module, which generates signals (e.g., in conjunction with transducers and the audio output module) signals. In some embodiments, the signal generating module includes a characteristics selection module, which is used for selecting values of signals characteristics for signals generated by the transducers;

a display module, which is used for displaying media (e.g., virtual-reality images, augmented-reality images, and/or mixed-reality images) in conjunction with the headset; and one or more databases, which store data, including:
spherical harmonic HRTF coefficients;
artificial-reality applications;
communication protocol information for storing and managing protocol information for one or more protocols (e.g., custom or standard wireless protocols, such as ZigBee or Z-Wave, and/or custom or standard wired protocols, such as Ethernet);
parameters describing anatomical features of one or more users; and
a library of templates (e.g., for each user and/or a general library of templates for a plurality of users) that can be matched with a user input to predict a goal target ray.

In some embodiments, the memory also includes a feature identification module, which receives images of the user captured by a camera and identifies a set of anatomical features from the images, which describe physical characteristics of a user relevant to the user's HRTF. The set of anatomical features may include, for example, the head diameter, shoulder width, height, and shape and size of the pinnae. The anatomical features may be identified through any image processing or analysis algorithm.

In some embodiments, the artificial-reality applications are implemented as software modules, which are stored on the storage device and executed by the processor. Each artificial-reality application is a group of instructions that, when executed by a processor of the artificial reality system, generates artificial-reality content (e.g., images, audio, or haptic feedback) for presentation to the user. An artificial-reality application may generate artificial-reality content in response to inputs received from the user via movement of the headset.

Each of the above identified elements may be stored in one or more of the previously mentioned memory devices, and corresponds to a set of instructions for performing the function(s) described. The above identified modules or programs (e.g., sets of instructions) need not be implemented as separate software programs, procedures, or modules, and thus various subsets of these modules can be combined or otherwise rearranged in various embodiments. In some embodiments, the memory stores a subset of the modules and data structures identified above.

The artificial-reality systems described above in connection with FIGS. 1-3 may facilitate and/or contribute to artificial-reality experiences for users.

Figure 4:
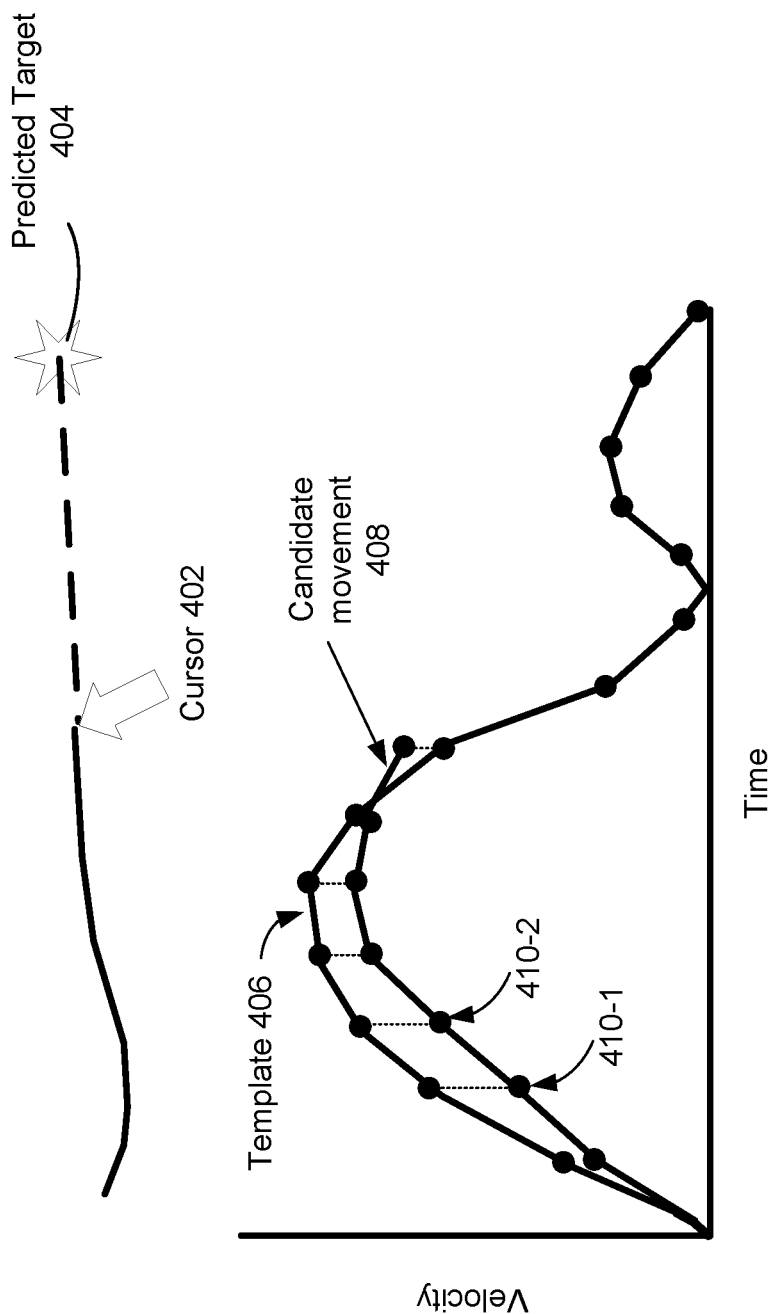
FIG. 4 illustrates comparing a partial candidate movement to a known template in accordance with some embodiments.

FIG. 4 illustrates a kinematic template matching (KTM) technique that uses a velocity profile of a cursor as a 2D stroke gesture, which allows it to be recognized using a template matching algorithm. Endpoint prediction techniques are used to predict where the user will click while the mouse is still in motion. In a 2D environment, endpoint prediction techniques include regression-based extrapolation, target classification, and kinematic template matching (illustrated in FIG. 4).

Regression-based extrapolation uses existing models of cursor movement behaviors to predict the location of a distance target based on a partial movement. Target classification uses knowledge of targets in the environment to identify a most probable candidate target. For example, calculating a cumulative score for each target based on the cursor's angle of movement.

As illustrated in FIG. 4, KTM considers the velocity profile of a partial pointing movement as a 2D stroke gesture, and then compares it to a library of known "template" movements to predict the final cursor location. This technique offers a number of advantages over the other reviewed techniques: it is target-agnostic, user-adaptable, and easy to implement. The KTM approach is split into a four-step process: building a template library, preprocessing new candidate pointing movements, performing the template matching, and estimating the cursor endpoint.

In the first step of KTM, a library of templates is generated using a collection of previous pointing movements. For example, each template consists of a velocity curve (e.g., the velocity curve template 406), describing previously determined (e.g., logged) velocity movements and the associated distance travelled. The template is then compared to the current movement, which is tracked by the velocity of the cursor 402 as it progresses towards the target (e.g., the predicted target 404), and its associated total distance travelled.

In some embodiments, the velocity profiles are truncated to remove overshoots, and then resampled (e.g., to 20 Hz). In some embodiments, the library consists of approximately 1000 templates. In some embodiments, the technique compares a user's movement (e.g., as represented by the velocity curve of candidate movement 408) to the user's own personal library of templates (e.g., excluding templates associated with other users). This allows the results to be personalized to each individual's pointing behaviors.

The next stage in the process occurs when a new pointing movement is being made (e.g., a candidate movement 408). For example, the associated velocity profile is resampled to 20 Hz and smoothed using a Gaussian filter. To prepare for template matching, each template in the library is truncated to match the duration of the candidate movement, and the same smoothing is then applied. In some embodiments, the smoothing of the templates happens after they are truncated.

Once this preprocessing is completed, the candidate movement is compared to each template (or a subset of the templates) in the library. This comparison occurs at the arrival of each new candidate movement point. In some embodiments, a cumulative scoring function is used to compare the candidate movement to the template. For example, the comparison may use the following cumulative scoring function:

$$S(T_i) = S(T_1^*) + \begin{cases} \dfrac{\sum_{j=0}^{n_c} |C_j - T_{ij}|}{n_c}, & n_c \leq n_t \\ \dfrac{\sum_{j=0}^{n_t} |C_j - T_{ij}| + \sum_{j=n_t+1}^{n_c} C_j}{n_c}, & n_c > n_t \end{cases} \quad (1)$$

where $T_i$ is the ith template in the library; $S(T_i)$ is the current score for the ith template; $S(T_i^*)$ is the prior calculated score, $C_j$ and $T_{ij}$ are the jth velocity values from the candidate's and current template's smoothed velocity profiles, respectively; $n_c$ is the number of points in the candidate's smoothed velocity profile; and $n_t$ is the number of points in the current template's smoothed velocity profile. In some embodiments, the cumulative scoring approach is used to help identify templates that match the candidate movement consistently across the arrival of each new candidate movement point. In some embodiments, once the candidate movement has been compared to at least some (or all) templates, one or more templates with the lowest scores are selected as the best match.

For example, FIG. 4 shows a velocity curve of a candidate movement 408 (corresponding to the movement of the cursor 402 performing a stroke from left to right) being compared to a velocity curve of the template 406. At each candidate movement point 410 (e.g., the candidate movement points 410-1 and 410-2), a comparison is performed. Then, the cumulative scoring function is used to compare the candidate movement 408 with the template 406.

Finally, to predict the candidate movement's final endpoint (e.g., the predicted target 404), the travel distance associated with the best matched template is used (e.g., by applying that distance to the current direction of the candidate's movement from the original start point). In some embodiments, as with other endpoint prediction techniques, the accuracy of KTM improves as the candidate movement progresses towards the target. In some embodiments, a set of two of more best matching templates are used, and the predicted target is a weighted average of the templates (e.g., weighted according to their similarity to the candidate movement).

Figure 5B:
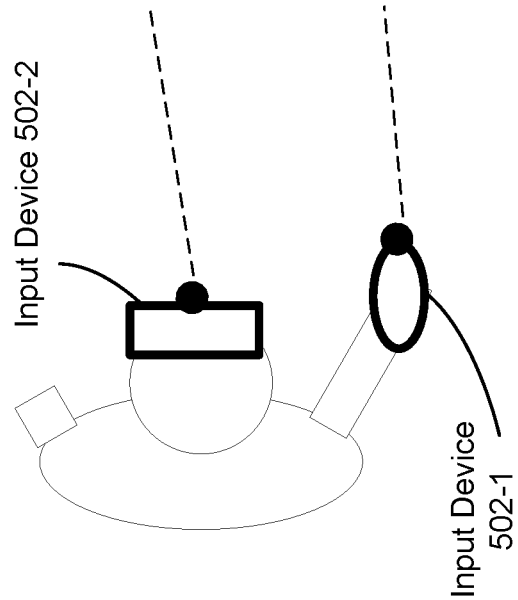
FIGS. 5A and 5B illustrate top views of a ray cursor acquisition movement in accordance with some embodiments.
Figure 5A:
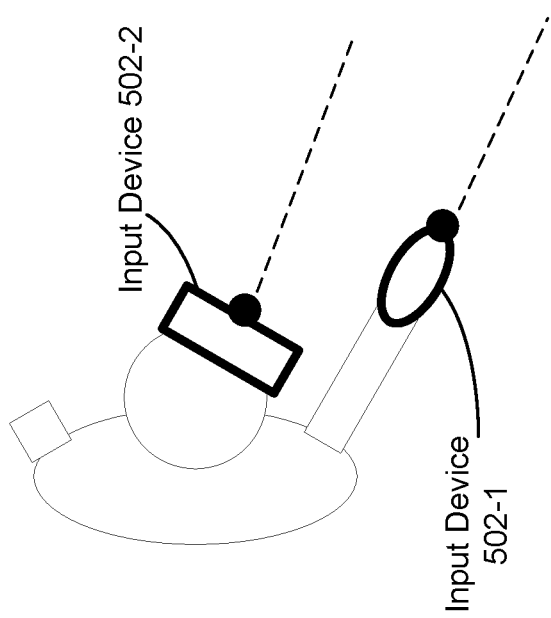

As shown in FIGS. 5A and 5B, in some embodiments, a predictive model for 3D ray cursor pointing is used. In some embodiments, a 3D ray cursor that operates like a virtual laser pointer is used as the input device (e.g., the first input device 502-1). A user, in a 3D environment (e.g., an Artificial Reality (AR) and/or Virtual Reality (VR) 3D environment), uses a handheld controller (e.g., with six degrees of freedom—referred to as "6-DOF") to specify an origin and direction of the ray. In some embodiments, the handheld controller has five or fewer degrees of freedom. For example, the first input device 502-1 is a handheld controller that emits a ray as an input device. In some embodiments, the final cursor location and direction is predicted, while the cursor movement progresses.

In some embodiments, a Kinematic Template Matching technique is used for 3D ray cursor selection. Because of the 3D environment, an "end point" per se (e.g., as 2D coordinates) is not predicted. Instead, the technique predicts a final position and direction of a ray (of the input device). The 3D coordinates of the handheld controller and the angle at which the ray is being emitted are measured. In some embodiments, the head (or and HMD) movement of the user is used to increase the accuracy of the predictions. For example, the head movement is measured by a forward direction vector (e.g., ray cursor) from the second input device 502-2 (e.g., an HMD).

In some embodiments, a top-n (where n is an integer greater than 1) approach to a best matching template is used. For example, a subset of n templates (from the library of templates) is used in the matching technique. In some embodiments, a weighted average of multiple matching templates is taken (e.g., to compensate for any individual matching inaccuracies). In some embodiments the weights are inversely proportional to the scores of the matching templates.

In some embodiments, the method for predicting the final position and direction of a 3D ray cursor includes the four phases of KTM: 1) building a template library; 2) preprocessing a candidate movement; 3) comparing the candidate movement to each template; and 4) calculating the cursor end-point (as explained above with reference to FIG. 4).

In some embodiments, the template library is built by capturing selection movements for known targets. The motion of the controller and the head (or the HMD) during selection are considered. Further, in a 3D environment, both the location and the angle of the controller (e.g., the first input device 502-1) and the head (or the HMD) (e.g., the second input device 502-2) are considered, as shown in FIGS. 5A and 5B.

FIGS. 5A and 5B illustrate top views of a three-dimensional ray cursor acquisition movement. Both the second input device 502-2 (e.g., the head or HMD of the user) and the first input device 502-1 (e.g., a handheld controller of the user) change in position and angle between a first time shown in FIG. 5A and a second time in FIG. 5B. In some embodiments, the change in position and/or angle is measured using accelerometers or other sensors (of the input devices).

Figure 6A:
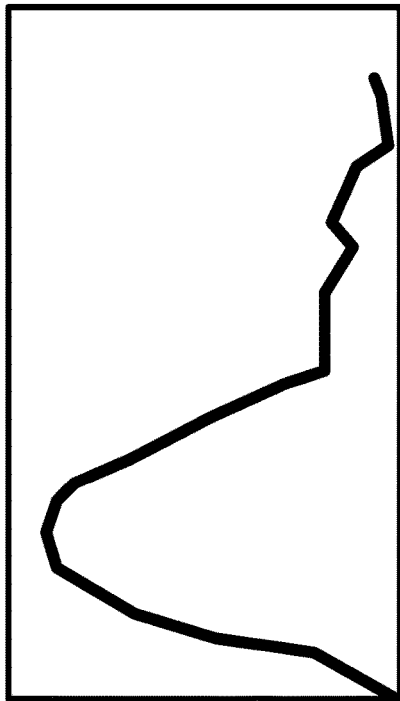
FIGS. 6A-6D illustrate a template with four velocity profiles in accordance with some embodiments.
Figure 6B:
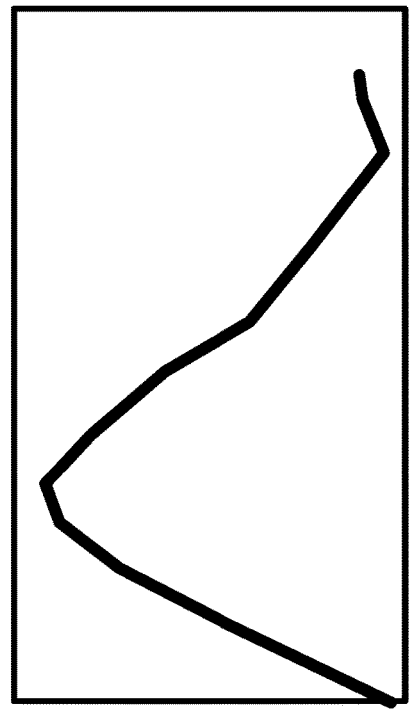
Figure 6C:
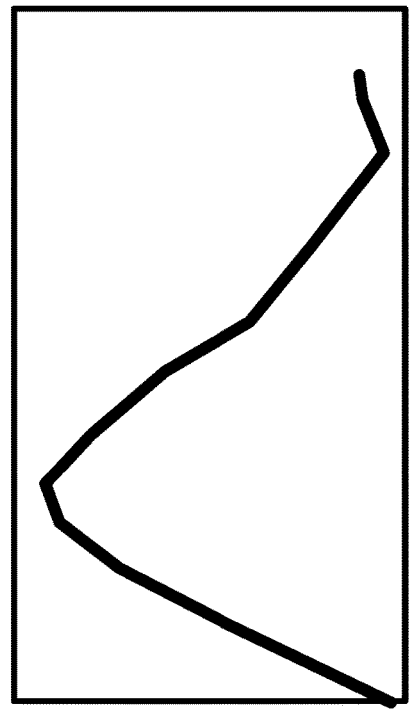
Figure 6D:
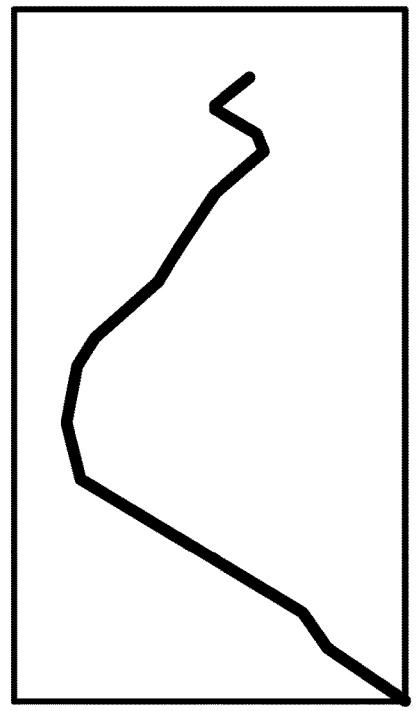

FIGS. 6A-6D illustrate a single template having four profiles:

a) a first profile in FIG. 6A showing controller positional velocity (CP) (e.g., the positional velocity of the controller);

b) a second profile in FIG. 6B showing controller angular velocity (CV) (e.g., the angular velocity of the controller, defined by the change in angle of the controller's forward-facing vector over time);

c) a third profile in FIG. 6C showing head positional velocity (HP) (e.g., the positional velocity of the head, defined by the change in the HMD's (X, Y, Z) origin coordinates over time); and d) a fourth profile in FIG. 6D showing head angular velocity (HV) (e.g., the angular velocity of the head, defined by the change in angle of the HMD's forward-facing vector over time).

In this example, each individual template has four velocity profiles. In some embodiments, a template has one profile, such as the positional velocity of a first input device and/or the angular velocity of the first input device. In some embodiments, a template has two or three profiles. For example, some templates include only the controller and/or the head or HMD as profiles (e.g., movement parameters) of the template.

In some embodiments, the KTM technique modifies the template library to crop any backtracking from a template. In some embodiments, an initial smoothing of the templates is performed (e.g., to correct for noise introduced with midair 6-DOF devices). For example, a Gaussian smoothing operation is performed on each of the velocities using a 5-point window. The velocity profile is then resampled, for example to 20 Hz, in preparation for comparison to subsequent candidate movements.

In some embodiments, as a new candidate movement is captured, the position and angle values of the one or more input devices (e.g., the head or HMD and the controller) are collected. This is used to create the four partial velocity profiles illustrated in FIG. 6, which are smoothed using a 5-point Gaussian window, and resampled to 20 Hz as each new point is collected. Each velocity profile is then truncated in the template library when the profile is longer in duration than the candidate movement. In this way, the template profiles have the same length as the candidate movement.

In some embodiments, only one input device (e.g., a handheld controller) is used to generate templates and perform the template matching. For the input device, at least two movement parameters (e.g., angular velocity and positional velocity profiles) are captured for the device. The template is then based on the captured two movement parameters for that input device.

In some embodiments, more than two input devices are used to generate templates and perform the template matching. Thus, in some embodiments, the template consists of six or more movement parameters (e.g., velocity profiles).

The candidate movement C is then compared to each template $T_i$ at the arrival of each new movement point using a scoring function, such as the cumulative controller scoring function presented in Equation (1) above. In some embodiments, this scoring calculation is repeated at least four times (e.g., once for each of the four velocity profiles). The four scores are defined as $S_{cp}$, $S_{cv}$, $S_{hp}$, and $S_{hv}$, corresponding to the velocity profiles CP, CV, HP, and HV. The final cumulative scoring function, $S(T_i)$, is then defined as a weighted sum of the four individual scores:

$$S(T_i) = aS_{CP}(T_i) + bS_{CV}(T_i) + cS_{HP}(T_i) + dS_{HV}(T_i) \quad (2)$$

Here, a, b, c, and d are tuning parameters. Note that by setting a, c, and d to 0, the model reduces to KTM, using only the velocity profile of the controller angle.

In some embodiments, the n-best template matches are ranked using the minimum values of $S(T_i)$. To calculate the expected final movement angle of the ray, a weighted average of the movement angles of the top n templates is taken. In some embodiments, the weight $w_i$ for each template $T_i$ is the reciprocal of its score $S(T_i)$ and the associated movement angle distance is $d_i$. Using these values, the weighted average angular distance is calculated as:

$$\mu = \frac{\sum_{i=1}^{n}(w_i * d_i)}{\sum_{i=1}^{n} w_i} \quad (3)$$

Using this weighted average angular distance ($\mu$), the controller's initial angle is rotated by the magnitude of $\mu$, along the current angle of motion.

The same approach is used to calculate the expected controller location. Using the weighted average of the top-n template controller distances, the magnitude of this average is added to the initial controller position along the current direction of movement.

To select a value for n in the top-n matching templates, the four weighting components were set equal (a, b, c, d=1), and the cumulative accuracy of all trials across all participants using different values of n was calculated. In some embodiments, empirical testing indicates that n=7 produces good results while minimizing computational complexity.

In some embodiments, to select weighting values for the scoring function (e.g., the values a, b, c, and d in Equation (2), a tuning procedure is used with various combinations of individual components, optimizing for the accuracy of the model at 40% of the movement progress.

Figure 7:
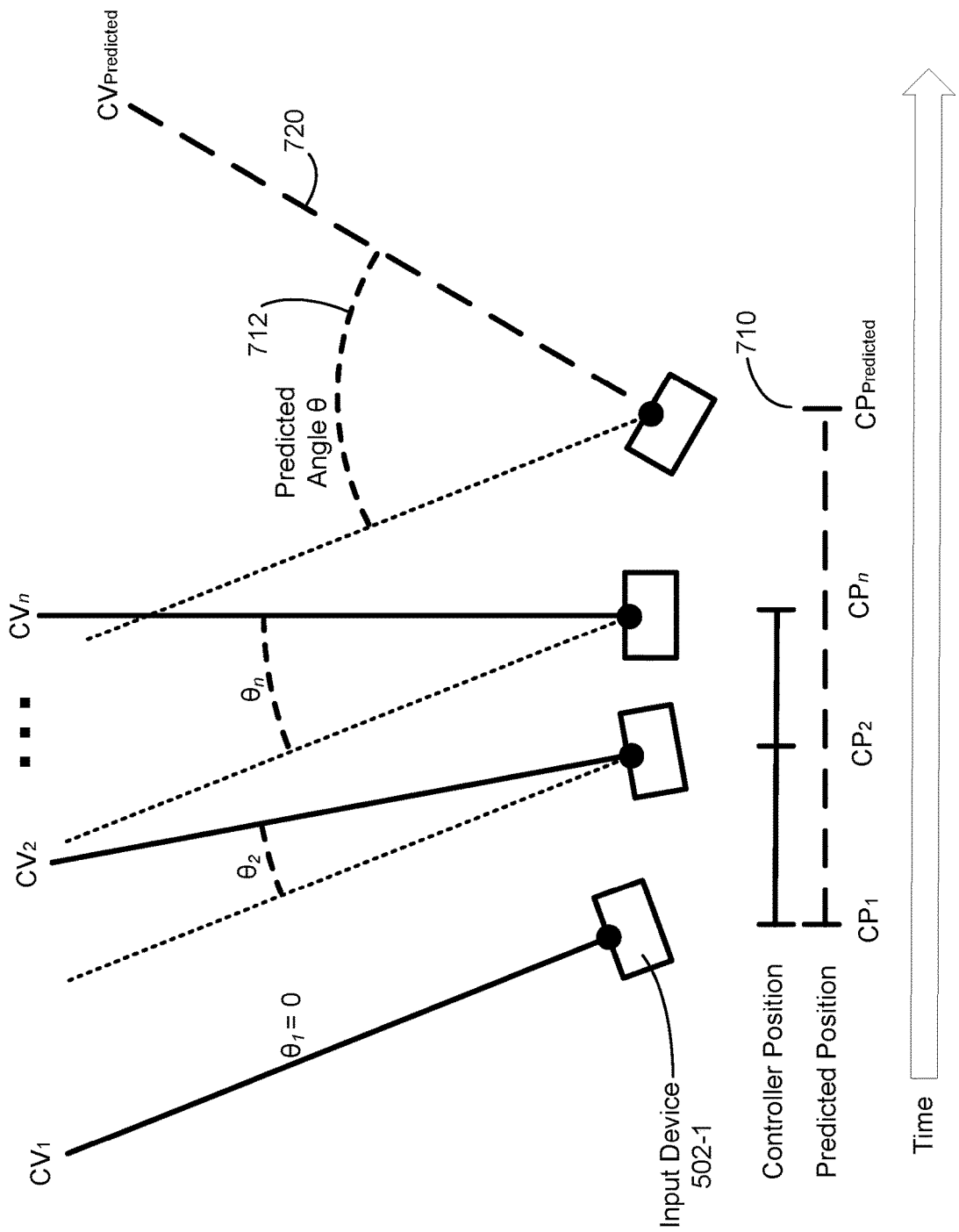
FIG. 7 illustrates predicting a final angle and position of a controller in accordance with some embodiments.

FIG. 7 illustrates that the predicted angle 712 and the predicted location 710 are combined to obtain the predicted ray cursor 720. Note that the goal target ray may represent any position on the path of the predicted ray 720. For example, the final measured angle $\theta_n$ and the final measured position $CP_n$ of the controller are used to predict the final location of the ray cursor (from the input device 502-1).

Figure 8:
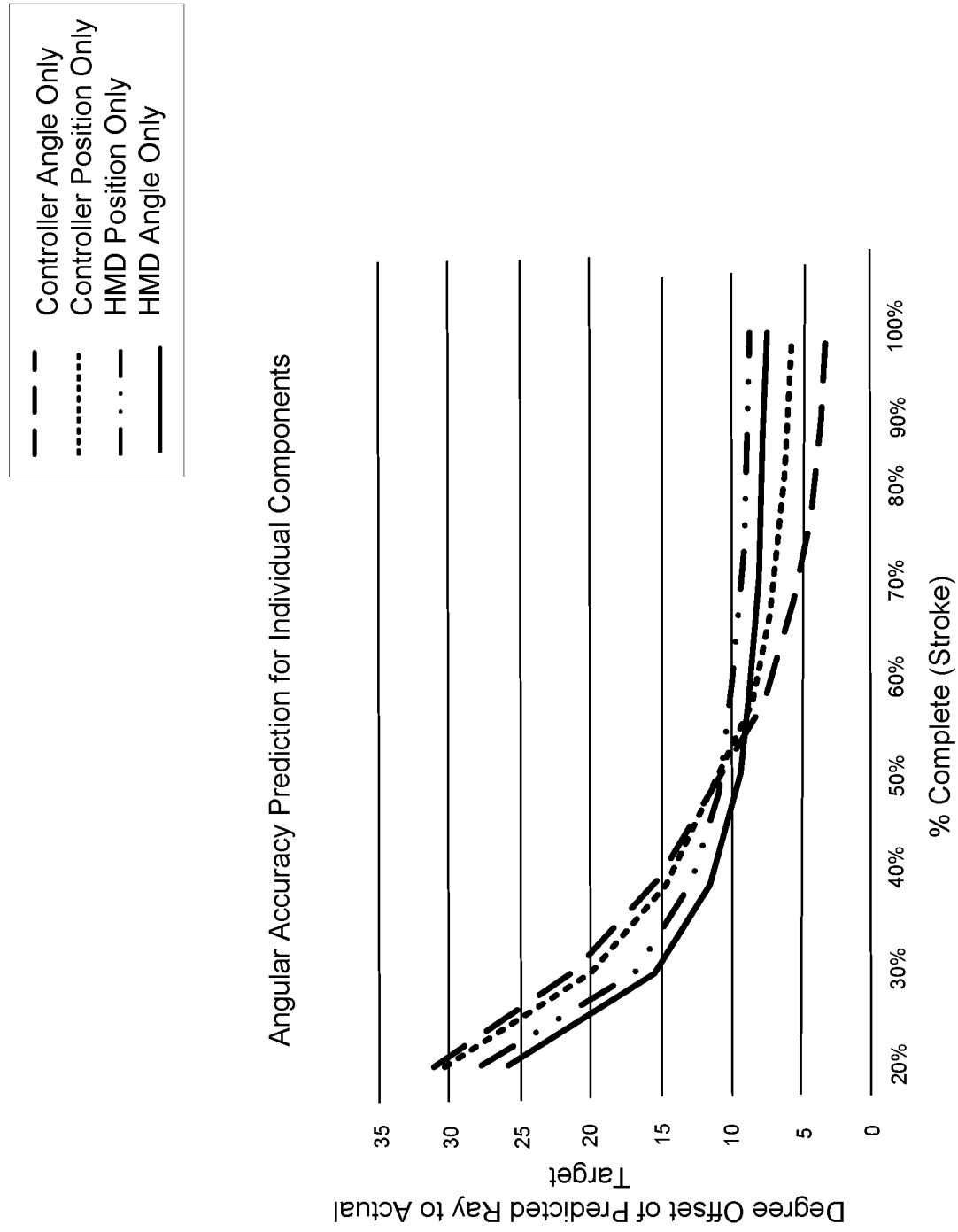
FIGS. 8 and 9 illustrate angular accuracy for predictions using different methods in accordance with some embodiments.

FIG. 8 illustrates the prediction accuracy that may be elicited by each input channel's velocity curve at different stages of stroke completion.

As illustrated in FIG. 8, the HMD angle provides the best indicator for the first half of the movement, but it is quickly overtaken by the controller angle around 55% of the way through the motion. By weighing the relative importance of each of the four individual components (e.g., shown in the graph of FIG. 8), the values of a=0.95, b=0.5, c=0.86, d=1 were selected. These are referred to as proposed model HC-KTM-7, for "Head-Coupled KTM", with n=7. One of skill in the art recognizes that other values of weights a, b, c, and d can be selected, as well as different values for n.

Figure 9:
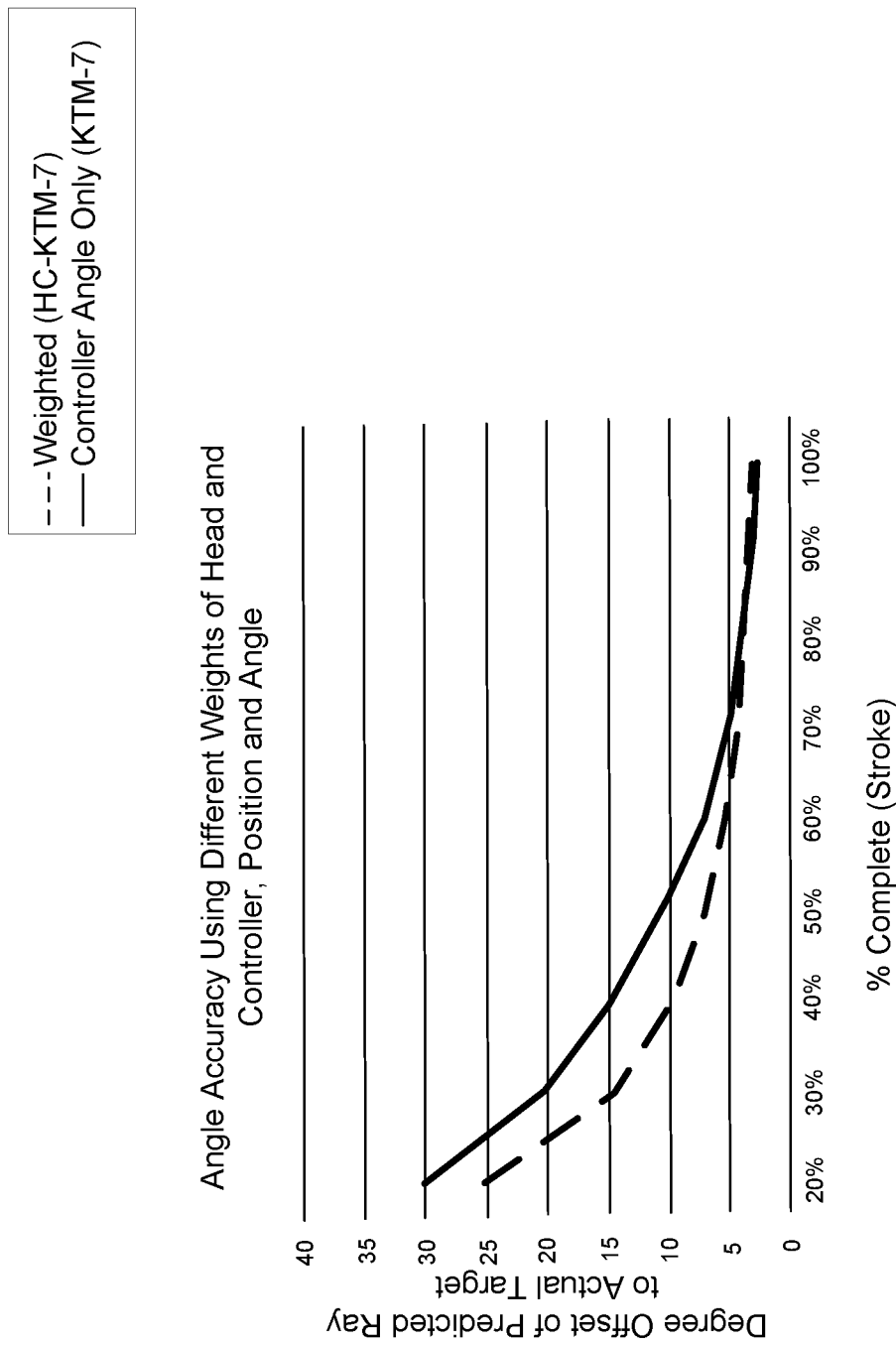
Figure 10:
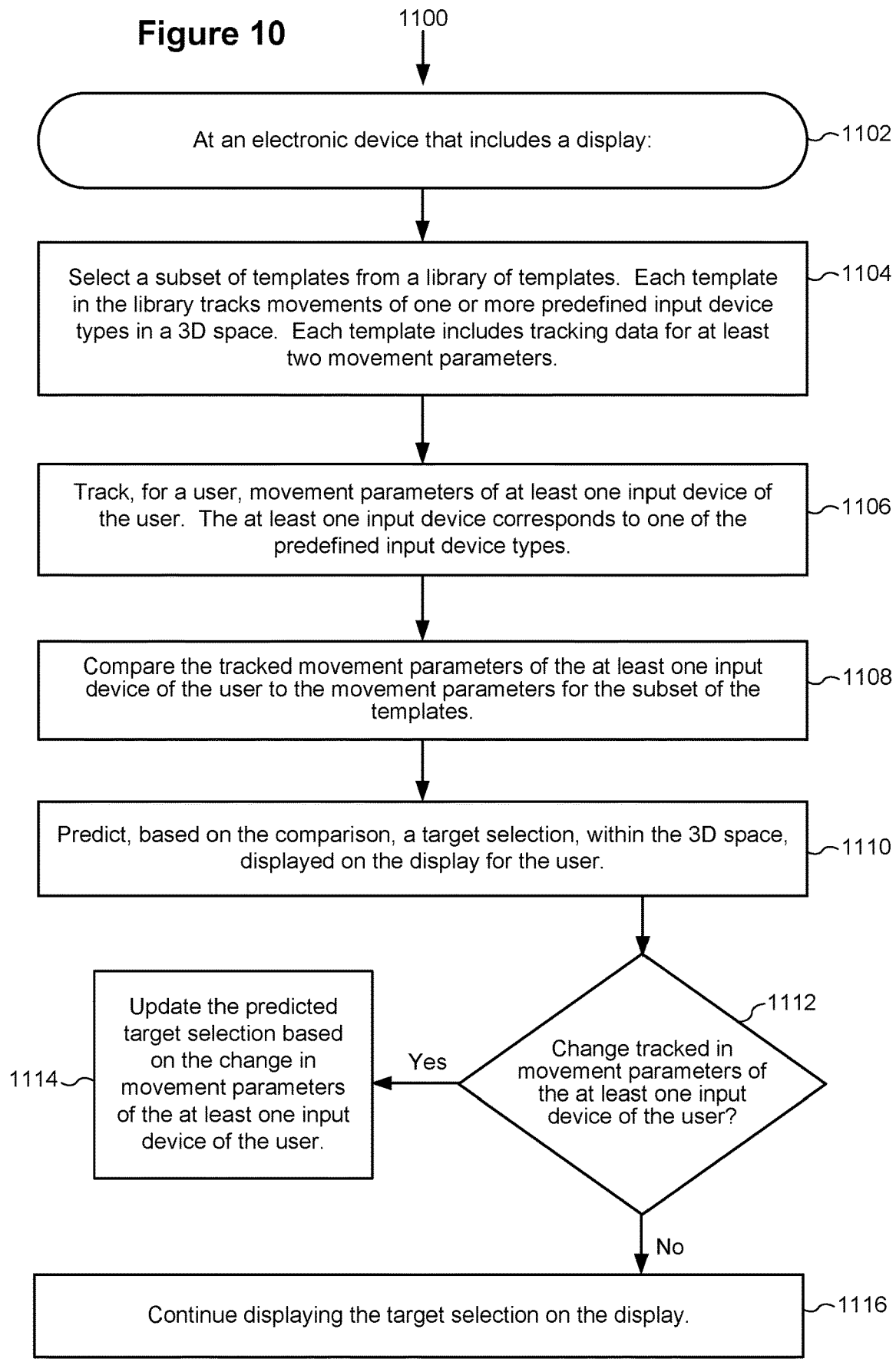
FIG. 10 is a flow diagram showing a method of predicting a goal target ray in accordance with some embodiments.

FIG. 9 is a graph showing the result of the weighted model (HC-KTM-7) compared to KTM-7 (where KTM-7 considers only the angular velocity of the controller). As explained above, the weighted model considers the angular and positional velocity for the controller and the angular and positional velocity for the HMD. The weighted model, HC-KTM-7 outperformed the baseline KTM-7 technique for early predictions. As a movement is nearing completion, both methods provide essentially the same accuracy.

While KTM-7 is more accurate than HC-KTM-7 at 90% movement completion, the Head Couple (HC-KTM-7) method was selected to be accurate at 40% completion, and by the second half of the movement, the controller is a better indicator of intent (as explained with reference to FIG. 8). This indicates that incorporating the head (or HMD) movements within a predictive model allows predictions to be made earlier (e.g., at a lower percent of completion of a user's stroke).

FIG. 10 is a flow diagram showing a method of predicting a future position and direction of a ray in a 3D space (e.g., AR and/or VR 3D environments), in accordance with some embodiments. Operations (e.g., steps) of the method 1100 may be performed by any of the artificial-realty devices described herein (or any combination thereof). The method 1100 may be performed on a large video display. At least some of the operations shown in FIG. 11 correspond to instructions stored in a computer memory or computer-readable storage medium (e.g., memory discussed above with references to FIGS. 1-3). For example, the operations of the method 1100 may be performed, at least in part, by an artificial-reality generation module and a display module.

As one example, the method 1100 may be performed (1102) at an electronic device. The method 1100 can be performed at other devices/systems discussed herein (e.g., at any of the devices discussed in FIG. 1, 2, or 3, or combinations thereof). In some embodiments, the electronic device includes a display (e.g., an HMD). In some embodiments, the electronic device is coupled to a large display.

In some embodiments, the method 1100 includes selecting (1104) a subset of templates from a library of templates. Each template in the library of templates comprises logged movements of one or more predefined input device types in a 3D space. Each template includes tracking data for one or more movement parameters. In some embodiments, each template comprises logged movements of a first input device type (e.g., a controller) and a second input device type (e.g., an HMD). For each input device type, at least one movement parameter is measured. In some embodiments, for each input device type, at least two movement parameters are measured.

In some embodiments, the libraries are optimized to eliminate templates that are similar because many strokes are potentially similar. In some embodiments, the templates are scaled (e.g., for a smaller subset of templates) to result in faster computational time and allow for better template fitting.

In some embodiments, the one or more movement parameters of each template include a positional velocity and/or an angular velocity of the one or more input device types. For example, for each input device type (e.g., a handheld controller and an HMD), a positional velocity and an angular velocity are tracked (as described with reference to FIG. 6). In some embodiments, the one or more movement parameters of each template include the acceleration of the one or more input devices.

In some embodiments, the subset of templates includes seven of the templates from the library of templates. The seven templates are selected based on similarities between the seven templates and the tracked movements. In some embodiments, the number of templates to be included in the subset (e.g., to be included in a top-n matching algorithm) is determined based on which templates most closely match the current movements of the user. In some embodiments, the subset of templates includes all of the templates in the library of templates.

In some embodiments, the subset of templates is selected based in part on the user. For example, subset of templates represents templates created from historical movements of the user. In some embodiments, the library of templates (or a subset of templates from the library) corresponds to templates created by the user's previously tracked (e.g., logged) movements. In some embodiments, the template matching is individualized for a personal style of the user. In some embodiments, the subset of templates includes templates generated for more than one user (e.g., a general population of users). In some embodiments, the model is personalized to individual users. For example, the algorithm is tuned to each user as it only compares to their own templates. Training data is then needed for each user. In some embodiments, there are different categories of users and templates associated with each category of users. For example, one classification may group together expert users versus novice users (and the subset of templates is selected in accordance with the classification of each user). In some embodiments, templates in the library are scaled to better match the current movements of the user, and then in turn, the predicted ray position is modified accordingly. In some embodiments, templates in the library are hand-crafted to represent prototypical user movements.

In some embodiments, a new user is initialized with a generic template library, and the system slowly replaces that library with the user's own templates as more known movements are collected.

The method includes tracking (1106), for a user, movement parameters of at least one input device of the user. The at least one input device corresponds to one of the predefined input device types. For example, the angular velocity and the positional velocity are tracked for at least one input device (e.g., a handheld controller and/or an HMD) of the user.

In some embodiments, the at least one input device of the user includes a hand (or finger) of the user and/or a handheld controller of the user.

In some embodiments, the at least one input device of the user includes the user's head (or an HMD).

In some embodiments, the at least one input device includes two input devices. In some embodiments, the at least one input device of the user includes a hand of the user and the head (or HMD) of the user and the tracked movement parameters comprise movement parameters of the hand of the user and movement parameters of the head (or HMD) of the user. For example, as shown in FIG. 6, the positional velocity and the angular velocity movement parameters are measured for each of the input devices of the user (e.g., the HMD and the controller).

In some embodiments, the tracked movement parameters of the at least one input device of the user is not a full movement of the user. For example, the full movement of the user corresponds to the user moving the at least one input device to the end of the stroke movement (e.g., when the user stops the movement to, for example, select a target). In some embodiments, the full movement of the user corresponds to an end point of the stroke where a target would be selected in the 3D space.

The method includes comparing (1108) the tracked movement parameters of the at least one input device of the user to the movement parameters for the subset of the templates selected from the library of templates. In some embodiments, comparing the tracked movement parameters of the at least one input device of the user to the movement parameters for the subset of templates comprises generating a weighted score for each movement parameter of the tracked movement parameters. In some embodiments, the weighted score (e.g., cumulative scoring function) is given by equation (2). In some embodiments, the weights are equal. In some embodiments, the weights are selected based on a quality of the template (e.g., some templates have greater weights because they are closer to the tracked movement). In some embodiments, probability distributions are used to help influence predictions.

The method includes predicting (1110), based on the comparison, a goal target ray, within the 3D space. In some embodiments, the goal target ray is displayed on the display for the user. For example, as shown in FIG. 7, a predicted controller position (CP) and a predicted controller angle (CV) are determined based on the tracked movement parameters of the controller. In some embodiments, the goal target ray corresponds to an end point of a ray cursor (e.g., the user input device). In some embodiments, the prediction of the goal target ray comprises a prediction of a movement (e.g., position and direction) of a ray cursor (e.g., created by the input devices). In some embodiments, predicting comprises using, for example, Equation 3, to calculate an expected angular distance and/or expected position of the at least one input device of the user.

In some embodiments, the prediction is generated while the user input device (e.g., cursor movement) is still in progress in 3D environments. For example, before the user has completed the full stroke (e.g., at 40% of completion of the stroke).

In some embodiments, the weights of the weighted score change dynamically for different portions of the user input. For example, the prediction is made based on tracked movement parameters for a first portion of user input using a first input device and based on tracked movement parameters for a second portion of the user input using a second input device (e.g., the first portion is the head (or HMD) movement and the later portion is a hand movement). For example, as shown in FIG. 9, the HMD angle and position provide a more accurate prediction in the first portion of the movement (e.g., the first 50% of the stroke), and the controller angle and controller position provide a more accurate prediction for the second portion of the movement (e.g., the last 50% of the stroke). Thus, different user input devices (e.g., different device types) are weighted differently at different moments of the complete movement (e.g., stroke).

In some embodiments, the prediction is made based on only a first portion of the tracked movement parameters of the at least one input device of the user (e.g., the first 50 percent of the user's movement). In some embodiments, the prediction is made before the user completes the movement. For example, before the user completes the full stroke, the prediction of the goal target ray is displayed to the user. In some embodiments, in response to the prediction, the goal target ray is automatically selected (e.g., without additional user input).

In some embodiments, the tracked movement matches (e.g., or corresponds to) a known template (e.g., a template that exists in the library of templates) and the prediction is based on the known template. For example, instead of using a subset of templates that includes multiple templates from the library, the subset comprises one template (e.g., one that closely matches the user's movement). In some embodiments, the tracked movement does not correspond to a known template (e.g., from the library of templates) and the prediction is based on an average of the aggregated subset of the library of templates.

In some embodiments, as the user's movement progresses (e.g., as the stroke completion increases), the tracked movement parameters of the at least one input device of the user change (1112). In some embodiments, in response to the change in the tracked movement parameters of the at least one input device of the user, the predicted goal target ray is updated (1114) based on the change in the tracked movement parameters. In some embodiments, the tracked movement parameters do not change (e.g., continue to follow a predicted template), and the electronic device continues to display (1116) the goal target ray.

In some embodiments, the method further includes displaying, on the display, a visualization of the goal target ray based on the prediction. In some embodiments, the visualization comprises zooming or highlighting the predicted target.

In some embodiments, the method further includes prefetching content based on the prediction. For example, the method improves latency by preloading content into the 3D space (e.g., before the user has completed the movement/ selected the target).

In some embodiments, the visualization comprises an augmentation of the cursor itself (e.g., bending or expanding its size), an augmentation of the target to help the user (e.g., resizing the target(s), or use different target arrangements), an adjustment to the ratio of the controller's perceived movement, or highlighting targets in a different manner.

In some embodiments, displaying the visualization causes a change in the user's behavior. For example, if one employs a technique to change how the cursor moves, this may in turn change users' behavior, affecting the performance of the model. For example, the prediction should be updated in accordance with the user's movements.

Gaze-Enhanced Template Matching

Some embodiments utilize eye gaze data to further enhance the predictions. Some embodiments take into account coordination between hand movements, head movements, and eye movements through a controlled experiment. Some embodiments use a resulting model, referred to herein in some instances as gaze-coupled kinematic template matching, that further enhances the predicted landing positions (e.g., some experiments have shown an increased accuracy when 40% of the way through the movement). Some embodiments utilize multimodal input to inform selection predictions in VR environments for improved pointing facilitation techniques. By leveraging these multimodal input streams, some embodiments predict a user's intention before an action occurs.

In some instances, the head provides an early indication of the intended movement direction, but rarely orients directly towards the final target position. As such, some embodiments consider a second model that utilizes the user's eye gaze as an additional input channel. The eye gaze can provide a more accurate indication of the final landing position of the cursor, since users are more likely to look directly at targets prior to selection. While many interactions that utilize gaze or head movements have been proposed for VR and AR environments, conventional techniques do not use the hand-eye or hand-head coordination patterns during target selection in VR. Some embodiments use a model for these behaviors in the design or enhancement of VR interactions techniques.

Some embodiments take into account coordination patterns between the eye, head, and hand during target acquisition in VR. In some embodiments, controlled experiments guided the design. For example, users completed two tasks, one requiring visual acquisition of targets, and one requiring target selection with a handheld controlled ray pointer. One set experiments looked at a task where the next target location is predictable and unpredictable. Furthermore, each experiment studied two conditions—one where the head is fixed on a chinrest, and one where the head is free to move naturally. Some embodiments model behavior observed the different combinations of head, hand, and eye movements during target acquisition in VR from this combination of tasks and conditions. Some embodiments capture data from the experiments to model coordination patterns, and/or to test and/or train another model that incorporates gaze data, in a model that is sometimes called gaze-couple kinematic template matching (GC-KTM). Experimental results showed that GC-KTM further improves the prediction accuracy compared to head-coupled kinematic template matching (HC-KTM). Some embodiments handle data loss, signal noise, and distinguishing between primary and secondary fixations.

Some embodiments use predictive models to improve VR user experiences. Some embodiments use pointing facilitation techniques enhanced by biasing towards the model's predicted region. Some embodiments provide broader applications, beyond pointing facilitation, such as haptic retargeting, foveated rendering, and latency reduction techniques. In some embodiments, such techniques are improved by inferring a user's intentions prior to the associated actions occurring.

Some embodiments adapt KTM endpoint prediction to VR environments. Some embodiments provide a HC-HTM algorithm that integrates velocity data from both the controller and the head. Some embodiments use a GC-KTM algorithm that integrates velocity data from the controller, head, and eye gaze.

Some embodiments use VR selection techniques, cursor endpoint prediction, gaze-based input, and kinematic template matching model. Some embodiments use a HC-KTM model. Some embodiments use results from an empirical study which evaluates the HC-KTM model, and compares its prediction accuracy to traditional KTM and a baseline model of using the raw cursor position. Some embodiments use a gaze-enhanced or GC-KTM algorithm. Some embodiments evaluate the algorithm in a controlled study.

Distant Pointing on Large Displays

Virtual laser pointing is a common selection metaphor to use when interacting at a distance with large displays, and in many ways is analogous to ray pointing in VR environments. To address the performance detriments associated with the required angular accuracy, some embodiments use techniques to increase precision, such as adapting the control-display ratio (C-D ratio) based on cursor velocity.

Another approach leverages a technique where ray pointing is first used for coarse positioning and then for precise positioning (sometimes called "dual-precision" techniques). Some embodiments use a "dual-channel" technique where head orientation provides coarse control of the cursor and a handheld device handles precise positioning. Some embodiments extend this approach by instead leveraging the head-movement and gaze to inform a predictive model of the ray pointer landing position while the controller is still in motion.

Gaze and Head Input

In some embodiments, the term gaze refers to both movements of the eye and the head. In some embodiments, the term gaze is used to refer to eye movements only, and explicitly refer to movements of the head as head movements. Gaze is a well-known method in human-computer interaction technology (HCI technology) to provide input for interactive systems. Some embodiments use gaze and head movements for target acquisition, couple gaze and head movements with hand movements, use gaze and head movements within VR environments, and/or use gaze and head movements to predict user intent.

Coordination of Gaze and Head Movements with Hand Movements

Some embodiments use coordination patterns of gaze and hand movements. For physical movements, it is generally understood that hand movements are preceded by eye movements, to guide the hands towards the object of interest.

Experiments that studied the coordination of the hand and point of gaze during aiming, found that eye movements initiated 70 ms earlier than the hand, and that the point of gaze always arrived on target prior to the hand and at approximately 50% of the response time. Experiments that studied hand-eye coordination during object manipulations found four different fixation patterns (Locate, Direct, Guide, and Check), and also found that users may look away from a target just before acquisition occurs, and rarely gaze upon objects during manipulation during familiar interactions.

Some embodiments take into account coordination between gaze and mouse pointers. Some embodiments take into account hand-eye coordination patterns during target acquisition using a virtual cursor on a desktop computer. Some embodiments use 3 or more different gaze patterns strategies. For example, gaze either lead the hand, followed the cursor, or switched back and forth between the intended target and cursor.

Some embodiments use coordination patterns of eye and pointer in desktop tasks beyond target acquisition, including tracing, visual search and selection, web search, or real world PC use. In some embodiments, beyond desktop platforms, the coordination patterns and associated interaction opportunities, of gaze and touch are used for multi-touch surfaces.

Some embodiments use such techniques described above in VR environments. Some embodiments use gaze behaviors during hand interactions in virtual reality. Some embodiments use methods to perform real-time calibration of eye-tracking systems. If fixation points are predicted during object manipulations, then the location of those fixations are calibrated. Some embodiments consider a number of behavioral patterns during prolonged direct manipulation interactions in VR. Experiments found that fixations were most prevalent during the manipulation phase (as a pose to the reaching phase) during hand interaction. Some embodiments use gaze behaviors during distant target acquisition tasks while using a ray pointer.

Some embodiments use the coordination of head movements and gaze during visual exploration of virtual environments. Some embodiments use low-level viewing behaviors. Some embodiments model a freeform visual exploration task even when there is no specific goal that a user is drawn to. Some embodiments model behavioral patterns during explicit target selection tasks.

Gaze for Target Acquisition

Some embodiments use gaze as an input modality for target acquisition. Some embodiments use manual and gaze input cascaded (MAGIC). Pointing where the cursor jumped to the users gaze location, which is then refined with mouse movements. Some embodiments use dynamic calibration and cursor sensitivity and shown to outperform mouse pointing in certain situations. Some embodiments use gaze for target selection on large displays and during mid-air gestures. Some embodiments use natural gaze behaviors during VR pointing, and its coordination with hand an head movements. In some embodiments, captured data is used to ground and guide gaze based pointing techniques, such as those described above, in VR environments.

Gaze and Head Movements with HMDs

Some embodiments use gaze for HMD interactions. Some embodiments use eye movements in virtual environments. Some embodiments use a design space for such interactions.

Some embodiments use gaze for pointing in VR environments. Some embodiments use gaze based pointing instead of, or in addition to, hand-based pointing. Some embodiments use head-movements instead of, or in addition to, eye movements for better selection performance.

Some embodiments combine gaze with hand and head-based input modalities for interaction in VR. Some embodiments combine the eyes and pinch gestures to select targets in VR Some embodiments extend 2D magic technique to HMD environments by using gaze to jump the cursor position, and then head movements to refine its position. Some embodiments use a set of multimodal selection techniques for wearable AR. Some embodiments use a pinpointing technique, where coarse eye gaze movements are refined with precise hand and head movements. Instead of treating eye and head movements in separation, some embodiments use a set of selection techniques that utilize the integral relationship of eye and head movements.

Some embodiments use underlying coordination patterns with eye, hand, and head movements. Some embodiments produce data for the patterns and subsequently use the data for the development of new models for predicting where a user intends to point.

Utilizing Gaze and Head Movements to Predict Intent

Some embodiments utilize gaze and head movements to predict a user's intent. Some embodiments use natural gaze behavior during object manipulation on a tabletop display for intention recognition. Some embodiments use a neural-network based model to predict desktop selection targets by analyzing cursor, head movement, and gaze trajectories individually. Some embodiments use relative head-target and hand-target features to predict intended moving targets. Some embodiments predict saccade endpoints to aid with foveated rendering in HMDs. Some embodiments use head movements or hand-based target selection. Some embodiments use gaze coupled with head movements to predict the depth of targets in VR environments to help resolve targeting ambiguities.

Some embodiments use gaze and hand movements to predict intended targets in VR, focused on direct hand manipulations, coordinating the input channels. Some embodiments use an algorithm that takes the point of gaze as the prediction at the instant that a hand movement begins. In some instances, fixations do not always occur during reaching. Some embodiments apply such technique to remote target acquisition using ray pointing.

These predictive techniques all demonstrate potential uses of naturally occurring gaze and head movement data. However, conventional systems do not take into account the detailed behaviors of gaze and head movement during ray pointing in VR. Experiments conducted contributed produced data, which informed multimodal ray pointing prediction models, which predict the landing position of ray pointer movements, according to some embodiments.

The HC-KTM model described above is useful for VR ray-pointer predictions. By modifying the KTM model and introducing head-coupling and considering the top-n matches, the HC-KTM model's predictions were 1.8× and 2.7× more accurate than KTM and the baseline respectively, 40% of the way through a user's movements, in some experiments, according to some embodiments. In some embodiments, head movement provides an earlier indication of the user's intent (velocity profile figure). However, in some instances, the head does not end up pointing directly towards the target. Instead, users may move their head only enough so that the target is in their field of view. This, in part, may explain why the HC-KTM has the most substantial improvement in the early stages of a pointing movements. Unlike the user's head movements, the user's eye gaze may be an additional input channel that could provide both and early indication of the target location, as well as an accurate estimate of the final landing position. Described below is another model, gaze-enhanced template matching, which further adapts the model to incorporate the eye gaze movements during the pointing operation, according to some embodiments.

Some embodiments use gaze tracking in HMD platforms, thereby using three separate input modalities that can be naturally measured during target acquisition—the movements of the handheld controller, the movements of the HMD and the movements of the user's point of gaze. Some embodiments coordinate these three input modalities. Some embodiments use data related to the input modalities in interaction techniques, such as selection facilitation, error correction, or point of interest prediction.

An experimental study was conducted to study gaze behaviors during VR pointing, and to study how gaze is coordinated with hand and head movements. The experiment included two separate studies, under head-fixed and head-free conditions. The first study looked at visual target acquisition only. Users only need to look at a target to complete a task. This provided baseline data regarding users' natural fixation and saccade patterns independent of hand movements. Furthermore, the experiment included two conditions—one in which the head is fixed on a chinrest, and one in which a head is free to move. In this way, gaze patterns were studied independently, and in combination with head movements.

The second study looked at a target acquisition task using a handheld ray pointer. This studied how gaze patterns are impacted when performing a target acquisition task with the hand. As with the first study, the study also looked at a head-fixed and head-free condition.

Table 1 (shown below) summarizes the input modalities used in the two studies, across the two conditions. As can be seen, through this methodology, gaze behaviors in VR are visible, independent of head and hand movements, as also how the individual and joint presence of both head and hand movements are coordinated and impact these behaviors.

TABLE 1

|  | Gaze | Head | Hand |
|---|---|---|---|
| Experiment 1: Head-Fixed | X | | |
| Experiment 1: Head-Free | X | X | |
| Experiment 2: Head-Fixed | X | | X |
| Experiment 2: Head-Free | X | X | X |

During a target acquisition in VR, the controller, head, and gaze positions will all move. Some embodiments analyze and generate coordination patterns of these three input channels.

As shown above in Table 1, across the two experiments that studied the absence, individual presence, and joint presence of head, hand, and eye movements, the head and hand movements are coordinated with and impact gaze during target acquisition in VR.

Evaluation of Gaze-Enhanced Kinematic Template Matching

A first experiment (Experiment 1) studied eye patterns, and how they coordinate with head movements during visual target acquisition in VR. The experiment tested gaze patterns while wearing a head-mounted display. Furthermore, two conditions were tested—one in which the head is fixed on a chinrest and one where the head is free to move. Finally, two variations of the task were tested, one in which the target location is predictable and one for which it is random. This study enabled the understanding of the baseline gaze and head behaviors prior to involving a hand-controlled input device for target selection, according to some embodiments. The procedure and design of a second experiment (Experiment 2) are similar to that of the first experiment. The only difference is the users are asked to use the handheld controller to select the targets with a ray pointer. A virtual laser is omitted from the controller and targets were selected with the trigger to proceed to the next trial. Participants completed Experiment 1 and Experiment 2 in counterbalanced order.

Apparatus

The experiment was conducted using an HTC Vive Pro Eye head-mounted display, with a display resolution of 2160×1200, with an embedded eye tracker from Tobii. The eye tracker operated at a with a tracking frequency of 90 Hz. The position and angle of the HMD and controller is tracked using [HTC's integrated tracking sensors]. The HMD output updated at a frequency of 90 Hz, and the HMD positions and angles were updated at a rate of 90 Hz. The top button of the HTC handheld controller was used for input, to confirm visual acquisitions. The system ran on a 3.7 GHz Intel Core i7-8700k desktop computer with an NVIDIA GeForce RTX2080 graphics cards and was developed in the Unity3D programming environment.

Procedure

The study consisted of a visual target acquisition task. Participants were asked to focus on a target stimulus, which was rendered as a yellow sphere. The background of the scene was a gray gradient and subjects stood on an elevated platform above an infinite grid ground plane in the virtual environment. After fixation occurred, the user pressed the trigger of the handheld controller and the target would change its position. Users were asked to complete the task as quickly and accurately as possible. Each study consisted of two variants of a visual acquisition task.

The study consisted of two tasks. a) Task 1 consisted of 8 trials between to reciprocal target positions. b) Task 2 consisted of 8 trials between randomly positioned targets. The current target is rendered as a yellow sphere. The next target did not appear until the previous target was selected.

Task 1 was a reciprocal visual acquisition task, for which the user would acquire a pair of targets that were placed around the center of the user's viewpoint at controlled distances and angles. This task represented a condition where the users could predict the location the next target which they were going to acquire.

In Task 2, target positions were pre-generated and presented in random order. This task represented a condition where the users could not predict where a target would appear until the trial began, which could influence the head-eye coordination patterns.

Tasks were completed in one of two conditions. In the Head-Fixed condition, a custom-made, 3d-printed chin rest was used to constrain head movements, for studying eye movements in isolation of head movements. In the Head-Free condition, users were free to move their head naturally during the visual acquisition task. This condition was used to study the coordination between eye movements and head movements.

During the study, participants sat on a chair. In the Head-Fixed condition, the chinrest was adjusted to the participants' height to ensure a comfortable posture. In the Head-Free condition, the chinrest was pushed away from the participant's position and the system was recalibrated to the new center position of the head.

Prior to the study, to calibrate the system, the coordinate system was reset after the participant found a comfortable position on the chair, with the HMD in a resting state. The point between the eyes was set as the origin, with the positive axes being: left to right (X), bottom to top (Y), and back to front (Z). The eye tracker was also calibrated for each participant with a short [xx min] calibration procedure. Before each session, participants were given a 2-minute warmup to familiarize themselves with the tasks and conditions.

Design

A repeated measures within-participant design was used. Each trial consisted of a start position and end position. In Task 1, target pairs were positioned radially around the origin at opposite side at a fixed depth from the user (9 m). The direction (angle between target pairs) ranged from 0°-360° at 45° intervals, and the amplitude (magnitude of the angle) varied from 5°-60°, at 5° increments (FIG. 7). The angular width of the target (the angle of the target boundaries relative to the origin) remained fixed at 4.5 throughout the study. In Task 2, targets could appear randomly within the same bounding sphere determined by the outermost targets in Task 1. The distance between consecutive targets varied, as in Task 1, from 5°-60°, at 5° increments. The target positions used in the study, were at a fixed depth (9 m) from the user.

The experiment was performed in one session lasting approximately 60 minutes. The order of condition (Head-Free, Head-Fixed) was randomized across participants. Within each condition, participants would complete trials for Task 1 (reciprocal targets) and then trials for Task 2 (random targets), or vice-versa, also randomized. In Task 1 there were 12 blocks of trials, one for each amplitude in random order. Within each block there were 4 trial sets, one for each direction, also in random order. Within each trial set, there were 8 trials between reciprocal targets. In task 2, there were 16 blocks, with 24 trial sets each. However, within each trial set, the targets' positions were randomly chosen, eliciting a random set of directions but keeping the amplitudes between two consecutive targets within the 12 discrete values (5°-60°, at 5° increments) as in Task 1. This design resulted in 2 (experiments)×2 (conditions)×2 (tasks)×384 clicks (12× 4×8 for Task 1, 16×24 for Task 2)=3072 trials per user.

Given the random positions of targets in task 2, the next target would sometimes fall outside the participants' current field of view. This would cause the users to engage in a visual search behavior, looking for the position of the next target. This type of eye and head movement are not desirable for examining the ballistic trajectory of eye, head and hand movement when moving from one target to the next, without hesitation. To avoid this problem, the tests used a glowing effect in Task 2. A green glow would appear in the direction in which the next target is, when this falls outside the user's field of view. The green glowing effect was designed to be big enough for the users not to tend to focus their gaze on it, as it could have happened with a red dot or an arrow, for instance. Glowing effect signals in which direction the next target is going to appear. This was used in Task 2 to avoid the emergence of visual search behaviors when the next target falls out of the user's field of view Participants Twenty five participants were recruited with no major motor impairments, normal vision (no glasses or contact lenses were allowed to ensure accurate eye tracking), and ranged in ages. A Randot Stereo Optical Test was administered prior to the experiment to ensure adequate stereo vision.

Point of Gaze Data Processing

In some embodiments, eye tracking data provides time-stamped x, y, z coordinates, representing both fixations and saccades. To perform analysis on these two stages of gaze, some embodiments use any of the following approaches. Some embodiments pre-process input using Carolina's Kalman filter.

Some embodiments use a two-step velocity threshold method. In some embodiments, the method uses velocity thresholds to segment point of gaze data into fixations and saccades—a detection point (Vd), and anchor point (va) and an end point (vf). For example, vd=130 degrees/s, va=60 degrees/s, and vf=60 degrees/s. In some embodiments, this data processing procedure is applied to each trial to segment data into fixations and saccades.

Some embodiments examine point of gaze data in a fixed time window size (e.g., 100 milli-seconds), and detect a fixation if the points are all within a fixed dispersion angle (e.g., 1°).

Some embodiments examine standard deviation of gaze points. For example, some embodiments use a moving window of 0.6 seconds and check whether the standard deviation of the angle of gaze samples within this temporal window is less than 1°.

Results And Analysis

The experiments were used to study one or more of the following aspects:
  What do the displacement profiles look like for different amplitudes?
  How is this impacted by task?
  How is this impacted by condition?
  For free head, how do users coordinate their head and eye movements?
  How is this impacted by task?
  What are typical peak velocities?
  How close is the eye to the target in head fixed?
  How close is the eye to the target in head free?
  How close is the head to the target in head free?
  Is completion time impacted by amplitude/task/condition (e.g., using analysis of variance)?

Head Kinematic Metrics & Point of Gaze Parameters

In some embodiments, the results of the experiments were used to determine the following head kinematic metrics and/or point of gaze parameters:
  Peak velocity
  Peak Acceleration
  Time to Peak Velocity
  Time to Peak Acceleration
  Time proportion to peak velocity
  Time proportion to peak acceleration
  Displacement proportion of peak velocity
  Number of significant deviations in the acceleration profile Gaze-Enhanced Kinematic Template Matching Predictive Model Some embodiments use data collected in the previous study to extend the predictive model (sometimes called a KTM Model) described above to use gaze data as well as controller and HMD. Some embodiments extend the HC-KTM-7 model to include the velocity of the gaze forward vector as an input channel. In some embodiments, this vector is output directly by the eye tracker as a combination of the individual gaze vectors for both the left and right eye, and is a normalized vector pointing towards the direction of where the user's gaze is oriented.

Some embodiments use the data collected in the study to generate new templates and extend the template matching algorithm to process data from several (e.g., five) input streams. Some embodiments evaluate each user's recorded data against their own template.

Some embodiments use the data collected to perform predictive modelling of a user's region of interest while they are in the midst of performing an acquisition movement. Some embodiments predict saccade endpoints based on captured saccade velocity profiles. Some embodiments perform regression modelling over all three channels of input to predict the endpoint of a user's movements.

Some embodiments use 80% of the data (collected from experiments described above) to build a regression model, and 20% of the data to test and compare model variations.

Target Hit Rates

When looking at the target hit rate, i.e., how often predictions fell within the bounds of the goal target, according to some embodiments, head-coupled KTM model out-performed the basic KTM condition, achieving an average hit rate of 46.2%, 70% of the way through a movement, compared to 37.6%. Furthermore, in some embodiments, to utilize the model, a target hit is only required to predict the intended target if it is in a densely populated area. Some embodiments combine selection refinement techniques with this predictive model in some instances. Alternatively, in some embodiments, the model is used to inform interface layouts, ensuring that adequate spacing between targets in VR environments is provided.

Additional Applications

Although the description above focused on 3D VR environment, in some embodiments, the model is used for 2D platforms. For example, although targets are shown in 3D space, the task itself could be decomposed into the 2D angular movements of the ray pointer. Specifically, some embodiments use the model for distant pointing on large, high resolution displays, where 2D angular ray pointing is also used. Some embodiments couple head and hand movements to divide large display pointing into coarse and precise modes. In some embodiments, while the model is applied to 2D tasks, it still uses 3D input channels. In particular, in some embodiments, the model estimates the final 3D position of the controller. The 3D movements of the hand can be substantial. For example, on average, the hand moved 18.7 cm, and as much as 45 cm, in some trials (average maximum across all participants). If the model were only based on 2D angular data of the ray, then the predictions would be less accurate. Typically, virtual ray pointing controllers provide full 6-Degrees of Freedom (DOF) input.

It is noted that although the description above focused on Head-Coupled KTM (HC-KTM), other predictive models, such as regression-based extrapolation and target classification, may be used in some embodiments. In some embodiments, models include probabil¬ty distributions across possible targets to influence predictions.

One aspect of 3D VR pointing is that multiple targets can be located along the same projected path at varying depths, requiring disambiguation. The HC-KTM model predicts the location of the ray, not the depth of the target. Some embodiments use additional input channels, such as gaze, to predict object depth and extend the model for 3D prediction. Some embodiments use selection refinement techniques when multiple targets fall along the ray.

Some embodiments examine more than just the movements across the center point of the user's field of view. Some embodiments use captured templates, just as templates are applicable across direction of movement. Some embodiments use the top-n approach in this context. Some embodiments capture movements for every possible target location, taking into account the resulting size of the template library.

Some embodiments use distractor targets. Some embodiments omit such targets to simplify the task environment and capture raw target acquisition movements. The visual presence of distractors could influence a user's behavior, which could in turn interfere with the model. In particular, a user may duck, lean, or reach around distractors to get a good view of their intended target. Some embodiments incorporate, or filter out, such behaviors.

Some embodiments use multiple participant pools so that the parameter values which were tuned may have are not biased towards a specific participant pool. Some embodiments validate across a large spectrum of users.

In some instances, predictions may not be as accurate as the actual ray position during the final stage of pointing. Some embodiments use a hybrid approach, using the model described above in the early ballistic phase of pointing, and consider the current ray position in the adjustment phase.

Personalization of Template Libraries

An advantage of the model personalization is that it can be tuned to each user; a drawback is that training data is needed. Some embodiments address this problem by starting a new user with a generic template library; slowly replacing that library with the user's own data as movements are collected. There may also be classes of users with similar behaviors, who could share predetermined template libraries. For example, users could be classified based on the extent with which they tend to move their head.

Complexity

A related factor is the number of templates that are in an individual's template library. Some embodiments use approximately 2000 templates for each user. In some embodiments, the model runs in real-time, with minimal optimization, with no perceivable impact on performance, at an input rate of 90 Hz. With each incoming input event frame, a prediction occurs in just under 11 mill-seconds. Some embodiments take into account resource constraints in computation-heavy virtual environments. Some embodiments use limits on the template library size. In some embodiments, the predictions are performed on a separate thread.

Selection Facilitation Techniques

Some embodiments use VR pointing enabling techniques that use movement predictions.

Techniques that dynamically adapt Control-Display (C-D) ratio benefit particularly from early prediction. As the user initially moves the cursor, it could accelerate towards the predicted region, and decelerate when it arrives. In some instances, the models described above perform best at the early stages of movement (e.g. 40% mark). In this case, the predicted landing position is precisely located at the intended target, as the technique would benefit from accelerating towards the general target region.

In some embodiments, target snapping benefits from early predictions—instead of just snapping to the closest target to the cursor, the technique snaps to the closest target in the predicted region. This could support faster access to targets, when predictions are made in the early stages of the movement. For a snapping technique, the required prediction accuracy sometimes depend on target layout. In a dense environment, the prediction is sometimes drawn to a nearby, inaccurate target. In some instances, the model works well for target snapping when there is an average of approximately 7° between targets. This would be large enough for larger UI buttons (e.g. the Oculus Quest Home screen buttons, which range from around 10°-20°). In some instances, this may be inadequate when selecting small and dense scene content in a VR environment.

In some instances, facilitation technique is likely to change the user's behaviors due to the perception/action loop in target acquisition. This in turn may impact the model's performance. Some embodiments collect data when prediction is inactive, and collect data and determine user behaviors when predictions are active.

Other Potential Applications

In some embodiments, predictive modelling improves other aspects of VR user experiences beyond target selection. Some embodiments use haptic retargeting in VR, where a user's movements are biased towards a physical proxy. The success of such techniques require the ability to predict what region a user is moving towards. Similarly, foveated rendering which provides a higher resolution rendering at the user's point of focus, benefits from predicting where a user is going to gaze next. By leveraging the techniques described above, such predictions are made early enough to be unnoticeable by the user. Finally, by predicting earlier what a user will do, in some embodiments, associated processing begins proactively, reducing latency for associated intended actions. This could be especially useful in VR where the reduction of latency is particularly important.

In some embodiments, the technique is target agnostic, and as such predicts regions and not targets. In some use cases (e.g., foveated rendering, C-D gain adjustment), the technique is useful on its own, without making a specific target prediction. In other cases, the model is paired with facilitation techniques (e.g., target snapping) that are target-aware. In such circumstances, the predicted regions is used to identify target likelihoods.

In some embodiments, data is used to create new or improved selection facilitation techniques. Some embodiments take into account the presence of distractor targets. In some embodiments, data is used to create new probabilistic models to enhance selection or predict user intent. In some embodiments, data is used to infer an intended target's depth, and take into account varying target depths. Some embodiments use multiple personalization or calibrations to utilize taking into account individual variation in coordination patterns. Some embodiments determine efficient coordination patterns. For example, it is better to minimize head movement. Some embodiments test different tasks, such as tracing, steering, moving target acquisition, 3D manipulations. Some embodiments use virtual hand as the selection mechanism instead of ray pointing. Some embodiments use better eye tracking data and/or handle noise in eye tracking data. Some embodiments consider if the targets in the same 2D plane with the same distance to the user.

Some embodiments use personalized template libraries. In some experiments, accuracies were calculated for each participant when using other user's template libraries. In some cases, matching against the participant's own template library, achieved the best accuracies. The average result when comparing to other templates is still within 3° (9.96° vs.) 12.94°. Note that personalized data may be more important for some users likely depending on the uniqueness of their pointing behaviors. For example, the angular head movements of some users were only 29.2% of the average across all other participants.

Some embodiments use an endpoint prediction pipeline for 3D ray pointing in the context of VR. In some embodiments, this pipeline relies on dynamic models, signal processing, and/or machine learning techniques to continuously output predictions for unsegmented sequential data from the controller's position and orientation. Some embodiments use a regression-based solution that operates using controller data only, and/or take advantage of additional dynamic features from other VR environment devices (e.g., headset and eye tracker). Such implementations provide improved accuracy and effectiveness in relation to conventional techniques, while enabling cold start (no prior data or pre-training on the user and on a particular motor task), gesture modelling, and offering a pathway for online personalization and performance improvements. Some embodiments are segmentation-agnostic in that model is not aware of when a given motor task has started or ended, removing the need for a stroke segmentation algorithm at a client. Some embodiments reduce bias towards training dataset models and predict new pointing tasks, with different angular distances, that were not included in the training dataset. Some embodiments provide confidence on various input sources and/or prediction.

Some embodiments use a regression approach based on signal processing and machine learning algorithms. Some embodiments extract features from data that has been filtered by dedicated algorithms for each input source. Some embodiments use a random forest regressor (RFR) and/or support vector regressor (SVR). The random forest solution provides fast refit in real-time, allowing for online personalization, for online accuracy improvement and for generalization towards new motor tasks. The SVR model provides a light model for applications with restricted memory capacity.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated. Furthermore, the various components and embodiments described herein may be combined to form additional embodiments not expressly described.

What is claimed is:

1. A method of predicting future positions and directions of one or more input devices in 3D spaces, comprising:
   at an electronic device having a display, one or more processors, and memory storing one or more programs having instructions for:
   tracking, for a user performing a target acquisition movement within a 3D space, movement parameters of a plurality of input devices of the user;
   predicting, for the user, a region of interest within the 3D space, using a regression model, based on the movement parameters, wherein the region of interest includes a plurality of targets in close proximity; and
   predicting an endpoint of the target acquisition movement, within the region of interest, using a pointer facilitation technique.

2. The method of claim 1, wherein the plurality of input devices includes an eye tracking input device, each input device corresponds to a predefined input device type, and the movement parameters include gaze data from the eye tracking input device.

3. The method of claim 1, wherein the regression model represents coordination patterns between input channels of the plurality of input devices.

4. The method of claim 3, wherein the plurality of input devices includes an eye tracking input device, a head-mounted display (HMD), and a hand-held controller, and the coordination patterns describe coordination between eye, hand, and head movements of the user.

5. The method of claim 4, wherein the movement parameters include velocity profiles for the HMD and the hand-held controller, and a saccade velocity profile for the eye tracking device.

6. The method of claim 1, wherein predicting the endpoint of the target acquisition movement is performed by biasing the pointer facilitation technique to predict a goal target ray towards the region of interest.

7. The method of claim 6, wherein the biasing is performed during an early ballistic phase of the pointer facilitation technique corresponding to a ballistic trajectory of eye, head, and hand movement of the user when moving from one target to the next.

8. The method of claim 1, wherein the regression model is trained based on collecting a set of movement parameters for the plurality of input devices for a plurality of users performing one or more target acquisition movements.

9. The method of claim 1, further comprising:
selecting a candidate target from the plurality of targets based on predefined probabilities for presence of the plurality of targets in the 3D space.

10. The method of claim 1, further comprising:
dynamically adapting a control-display (C-D) ratio based on predicting the region of interest within the 3D space and/or the endpoint of the target acquisition movement.

11. The method of claim 1, further comprising:
predicting likelihood of targets to snap to a closest target in the region of interest.

12. The method of claim 1, wherein the plurality of input devices includes an eye tracking input device, and the movement parameters includes gaze data from the eye tracking input device, the method further comprising:
predicting object depth for one or more targets within the region of interest based on the gaze data.

13. An electronic device comprising:
a display;
one or more processors; and
memory storing one or more programs having instructions for:
tracking, for a user performing a target acquisition movement within a 3D space, movement parameters of a plurality of input devices of the user;
predicting, for the user, a region of interest within the 3D space, using a regression model, based on the movement parameters, wherein the region of interest includes a plurality of targets in close proximity; and
predicting an endpoint of the target acquisition movement, within the region of interest, using a pointer facilitation technique.

14. The electronic device of claim 13, wherein the plurality of input devices includes an eye tracking input device, each input device corresponds to a predefined input device type, and the movement parameters include gaze data from the eye tracking input device.

15. The electronic device of claim 13, wherein the regression model represents coordination patterns between input channels of the plurality of input devices.

16. The electronic device of claim 15, wherein the plurality of input devices includes an eye tracking input device, a head-mounted display (HMD), and a hand-held controller, and the coordination patterns describe coordination between eye, hand, and head movements of the user.

17. The electronic device of claim 16, wherein the movement parameters include velocity profiles for the HMD and the hand-held controller, and a saccade velocity profile for the eye tracking device.

18. The electronic device of claim 13, wherein predicting the endpoint of the target acquisition movement is performed by biasing the pointer facilitation technique to predict a goal target ray towards the region of interest.

19. The electronic device of claim 18, wherein the biasing is performed during an early ballistic phase of the pointer facilitation technique corresponding to a ballistic trajectory of eye, head, and hand movement of the user when moving from one target to the next.

20. The electronic device of claim 13, further comprising:
selecting a candidate target from the plurality of targets based on predefined probabilities for presence of the plurality of targets in the 3D space.

* * * * *